US006693631B2

(12) United States Patent
Hubeli et al.

(10) Patent No.: US 6,693,631 B2
(45) Date of Patent: Feb. 17, 2004

(54) SYSTEM AND METHOD FOR MULTI-RESOLUTION FAIRING OF NON-MANIFOLD MODELS

(75) Inventors: Andreas G. P. Hubeli, Zurich (CH); Markus H. Gross, Uster (CH); Richard P. Hammersley, Austin, TX (US)

(73) Assignees: ETH Zurich, Zurich (CH); Schlumberger Technology Corporation, Austin, TX (US)

( * ) Notice: Subject to any disclaimer, the term of this patent is extended or adjusted under 35 U.S.C. 154(b) by 442 days.

(21) Appl. No.: 09/755,268

(22) Filed: Jan. 5, 2001

(65) Prior Publication Data

US 2001/0030646 A1 Oct. 18, 2001

Related U.S. Application Data

(60) Provisional application No. 60/174,649, filed on Jan. 6, 2000.

(51) Int. Cl.$^7$ .............................................. G06T 17/00
(52) U.S. Cl. ....................................................... 345/420
(58) Field of Search ................................ 345/420, 423, 345/428, 581

(56) References Cited

U.S. PATENT DOCUMENTS

| | | | |
|---|---|---|---|
| 5,465,323 A | 11/1995 | Mallet | 345/423 |
| 5,506,947 A | 4/1996 | Taubin | 345/433 |
| 6,031,548 A | 2/2000 | Gueziec et al. | 345/440 |
| 6,046,744 A | 4/2000 | Hoppe | 345/419 |

OTHER PUBLICATIONS

Kos et al ("Physically based Relaxation of Unstructured Meshes": 1997, University of Ljubljana, Slovenia).*

Garland et al ("Surface Simplification using Quadric Error Metrics": Carnegie Mellon University, Proceedings of the 24th annua conference on Computer graphics and interactive techniques, Aug. 1997).*

Gueziec et al: "Converting Sets of Polygons to Manifold Surfaces by Cutting and Stitching" Visualization '98. Proceedings Research Triangle Park, NC, USA Oct. 18–23, 1998, Piscataway, NJ,USA IEEE,US, Oct. 18, 1998, pp. 383–390, 553.

Taubin G: "A Signal Processing Approach to Fair Surface Design" Computer Graphics Proceedings. Los Angeles, Aug. 6–11, 1995, Computer Graphics Proceedings (SIGGRAPH), New York, IEEE, US, Aug. 6, 1995, pp. 351–358.

"Multiresolution Signal Processing for Meshes", by Igor Guskov (Princeton University), Wim Sweldens (Bell Laboratories) and Peter Schröder (Caltech).

"Spectral Compression of Mesh Geometry", by Zachi Karni and Craig Gotsman of the Computer Science Department, Technion—Israel Institute of Technology, Haifa 32000, Israel.

"Eigenmeshes", by M. Gross and A. Hubeli of the Department of Computer Science, ETH Zurich, Switzerland; as published in "CS Technical Report #338", Mar. 30, 2000.

"Implicit Fairing of Irregular Meshes Using Diffusion and Curvature Flow", by Mathieu Desbrun, Mark Meyer, Peter Schröder and Alan H. Barr of Caltech.

"Multivariate Subdivision Schemes and Divided Differences", by Igor Guskov of Princeton University, Nov. 12, 1998.

"A Signal Processing Approach to Fair Surface Design", by Gabriel Taubin of the IBM T.J. Watson Research Center.

* cited by examiner

Primary Examiner—Almis R. Jankus
(74) Attorney, Agent, or Firm—Rosenthal & Osha L.L.P.

(57) ABSTRACT

A method of fairing a non-manifold model as disclosed which includes smoothing the model by applying a fairing operator to a set of features such that noise is removed after determining the features of the model.

23 Claims, 34 Drawing Sheets

SYSTEM AND METHOD FOR MULTI-RESOLUTION FAIRING OF NON-MANIFOLD MODELS

CROSS-REFERENCE TO RELATED APPLICATIONS

Priority is claimed under 35 U.S.C. §119(e) from Provisional Patent Application No. 60/174649, filed Jan. 6, 2000, entitled "System and Method for Multiresolution Fairing of Non-manifold Models", by Andreas G. P. Hubeli, Markus H. Gross, and Richard P. Hammersley.

FIELD OF THE INVENTION

This invention relates to the field of geometric modeling and smoothing models using fairing operators.

BACKGROUND OF THE INVENTION

In recent years, models of graphics applications are becoming more complex. Recent trends in graphics visualization include an increasing complexity of datatests, increasing sophistication of computational models, real time performance and scalability, interactive exploration and analysis, and quantitative analysis and error control. Driven by the need to manage model complexity there has been a convergence of graphics and modeling technologies. The design of multi-resolution mesh representations of three-dimensional models is no exception. Two different types three-dimensional models are manifold and non-manifold models.

These models are based on the principles of Euclidean geometry and specifically, Euclidean space. A manifold, in general, is defined as a topological space in which every point has a neighborhood that is homeomorphic to the interior of a sphere in Euclidean space of the same number of dimensions. Being homeomorphic means that there exists a one-to-one mapping between sets (in this case, a neighborhood and the interior of a sphere) such that both the function and its inverse are continuous and that topology exists for geometric figures which can be transformed one into the other by an elastic deformation. A basic non-manifold model (12) is shown in FIG. 2A and a two-manifold model (10) is shown in FIG. 2B. A surface is two-manifold (10) if all of it points have an open neighborhood homeomorphic to $\Re^2$. This definition can be extended to two-manifold surfaces with boundaries, where every point has an open neighborhood homeomorphic to either $\Re^2$ or $\Re_+^2$. If a surface does not satisfy these criteria, then it is called a non-manifold (12) as represented by a horizontal and a vertical surface together in FIG. 2A. Examples of non-manifold surfaces (12) include, for instance, self-intersecting surfaces or T-junctions. Most of the following research is directed toward the handling of arbitrary, two-manifold models (10). Research has not been directed towards the handling of non-manifold models (12).

Two key ingredients in the design of multi-resolution mesh representations include 1) a fairing or subdivision method and 2) a mesh simplification algorithm.

A subdivision method starts with a triangle mesh. The mesh is refined by subdivision and the mesh is smoothed by moving vertices. This method is accomplished by generating infinite subdivisions. In signal processing terms, it is upsampling followed by relaxation. An example of a subdivision method is Loop subdivision for the estimation of high resolution mesh from the simplified representation. See, D. Zorin, P. Schröder, and W. Sweldens, "Interactive Multi-resolution Mesh Editing", 1995.

A fairing method is a process of removing high frequency components from geometry. Fairing is an extension of low pass filtering in signal processing to meshes. An example of a fairing method is devised by L. Kobbelt, who is the first to demonstrate the advantages of discrete fairing method as a fairing operator for mesh editing. He combines a very fast multilevel smoother with a progressive mesh simplification algorithm. See L. Kobbelt, "Interactive Multi-resolution Modeling on Arbitrary Meshes", 1998.

Examples of mesh simplification algorithms are numerous. First is a progressive mesh that computes a sequence of progressively refineable meshes by successive application of an edge collapse operator. See H. Hoppe, "Progressive Meshes", 1996. In combination with appropriate data structures and error metrics, this method provides a very powerful representation for triangle meshes. Another method uses a vertex removal strategy with a local remeshing method to successively simplify an initially dense mesh. See W. Schröder, J. Zarge, and W. Lorensen, "Decimation of Triangle Meshes", 1992.

Mesh fairing is the most efficient way to enhance the smoothness of the mesh after simplification. Unlike geometrically motivated approaches to fairing that involve costly minimization of fairing functionals, G. Taubin uses a signal processing approach to mesh fairing. He is the first to map standard filtering techniques to meshes with arbitrary connectivity. This approach generalizes the notion of "frequency" to meshes of arbitrary connectivity by taking eigenfunctions of discretized Laplacian operator. Smoothing is accomplished by attenuation of the eigenvalues associated with the "high frequencies" of the mesh. This type of "low-pass" filtering band-limits the mesh and produces visually appealing models. Because the storage and computational cost is linear in the number of vertices, this approach is popular for mesh filtering. See, G. Taubin, "A Signal Processing Approach to Fair Surface Design", 1995.

Building on the research of Taubin, the next development uses an implicit fairing method using a backward Euler integration. Rather than using discretized Laplacian operators as the flow operator, a discrete curvature flow operator is used. These enhancements allow the construction of a more robust algorithm to smooth meshes with arbitrary topology and reduce the need of human supervision during the smoothing process. The algorithm also obtains better results, both with respect to the quality of the smoothing and the shape of the triangles in the mesh. See, M. Desbrun, M. Meyer, P. Schröder, and A. H. Barr, "Implicit Fairing of Irregular Meshes using Diffusion and Curvature Flow", 1999.

The next development is provided by Guskov and W. Sweldens. They combine non-uniform subdivision with a fairing algorithm to transform an arbitrary mesh into a multi-resolution representation. The details influence the mesh on an increasingly simplified scale with this multi-resolution representation, thereby resulting in an extension of the signal processing approach to triangle meshes. The most important difference between this new approach and the approaches of Taubin and Kobbelt is that the Laplacian operators not only approximate the topological information, but also consider the geometric information.

Different fairing operators may be used when fairing a mesh. A fairing operator is applied to intersected triangle meshes in a manifold or non-manifold model to achieve a smooth model. In rating the overall performance of the different operators, a trade-off between the speed and quality of the operators exists. The faster the operator performs the task, the quality of the operation declines. Also, as the quality of the operation performed by the operator increases, the speed declines since the complexity of the formula to accomplish the fairing requires much additional computational cost. There are four commonly accepted fairing operators. A comparison of the smoothing effect of each of the operators is shown in FIGS. 1A–1E. A non-smoothed sphere (8) is shown in FIG. 1A as a starting point for each of the listed operators. FIG. 1B shows the smoothing effect of an umbrella operator (1). The smoothing effect of the improved umbrella operator (2) is shown in FIG. 1C. The smoothing effect of the curvature flow operator (4) is shown in FIG. 1D. The smoothing effect of the second order divided differences operator (6) is shown in FIG. 1E. The fairing operator with the fastest speed and lowest quality is the improved umbrella operator (2). The best quality results are generated by the curvature flow operator (4) and the second order differences operator (6), but they are also the slower and more complex operators.

SUMMARY OF THE INVENTION

In one aspect, the invention is a system and method of fairing a non-manifold model that starts by determining the features of the model. A fairing operator is then applied to the features to smooth the model and remove noise.

An embodiment of the invention includes manipulating triangle meshes that define the non-manifold model at different levels of resolution.

An embodiment of the invention includes a local volume preservation method for models that starts by computing a volume of a tetrahedra defined by a plurality of triangle meshes. The triangle meshes are then moved along a fixed vector. The vertices are moved to compensate for the change in volume caused by the fairing operator while smoothing the model.

An embodiment of the invention includes a feature preservation method for models that starts by distinguishing between noise and the features of the model. The noise is removed and the features in the model are preserved using local operators. During the fairing process, the features are prevented from moving by setting a number of vertices to zero vertices.

Other aspects and advantages of the invention will be apparent from the following description and the appended claims.

DETAILED DESCRIPTION OF THE INVENTION

Figure 1A:
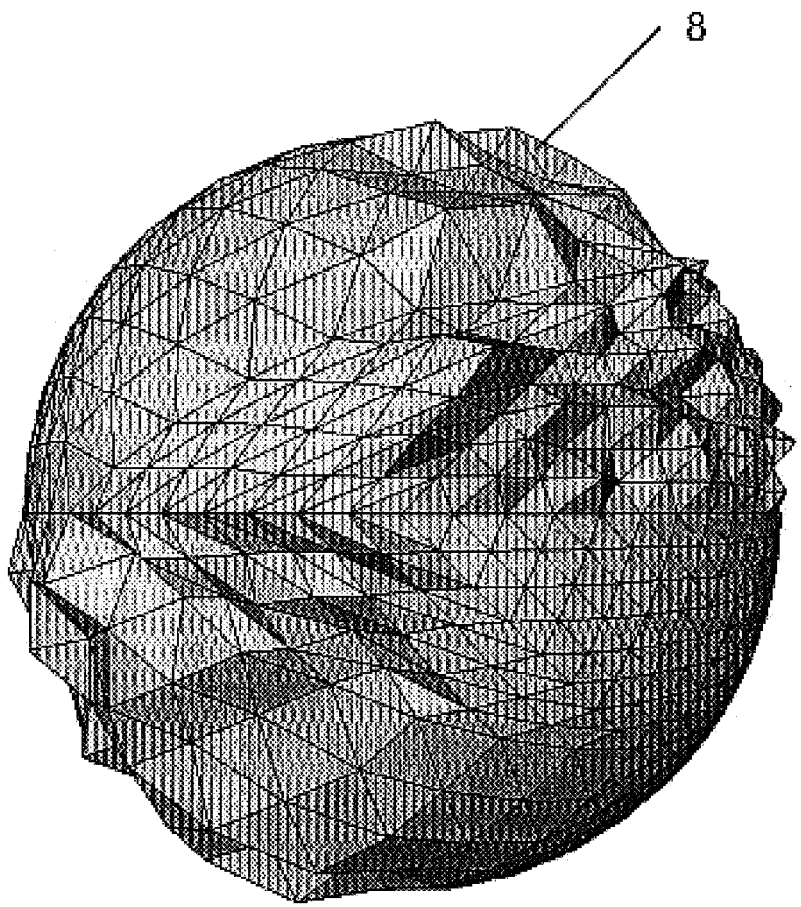
FIG. 1A illustrates a non-smooth sphere before fairing.
Figure 1B:
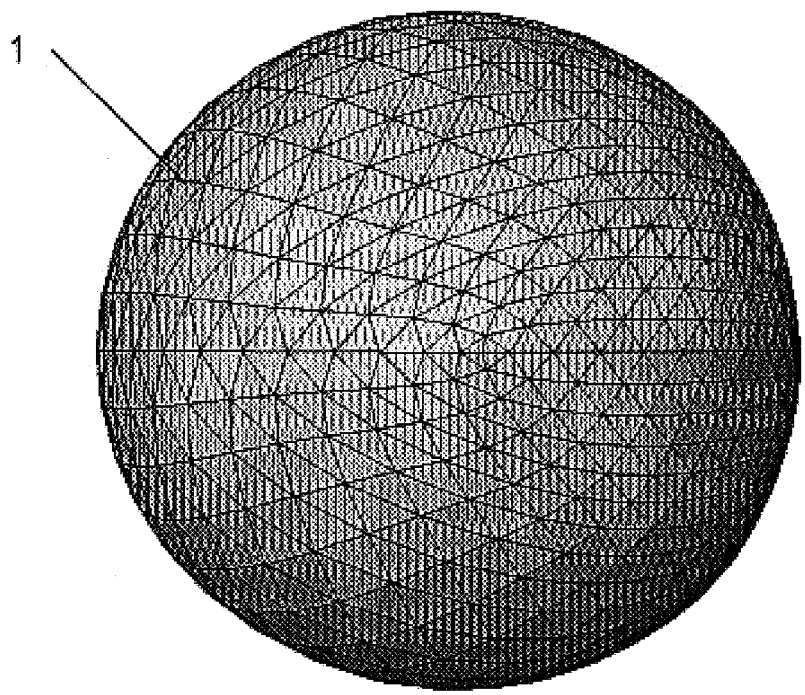
FIG. 1B illustrates a sphere following the smoothing effect of an umbrella operator.
Figure 1C:
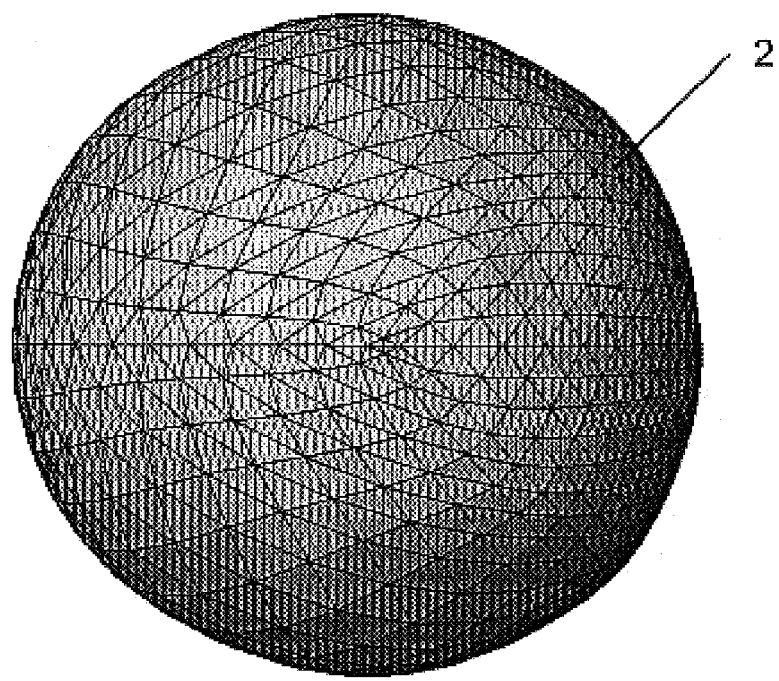
FIG. 1C illustrates a sphere following the smoothing effect of an improved umbrella operator.
Figure 1D:
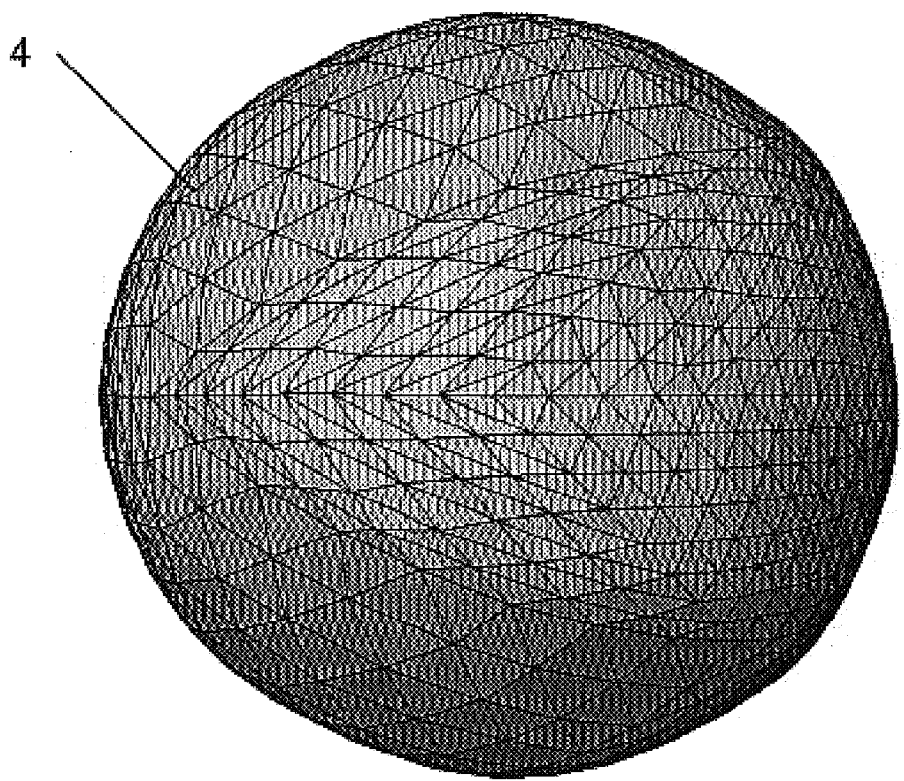
FIG. 1D illustrates a sphere following the smoothing effect of a curvature flow operator.
Figure 1E:
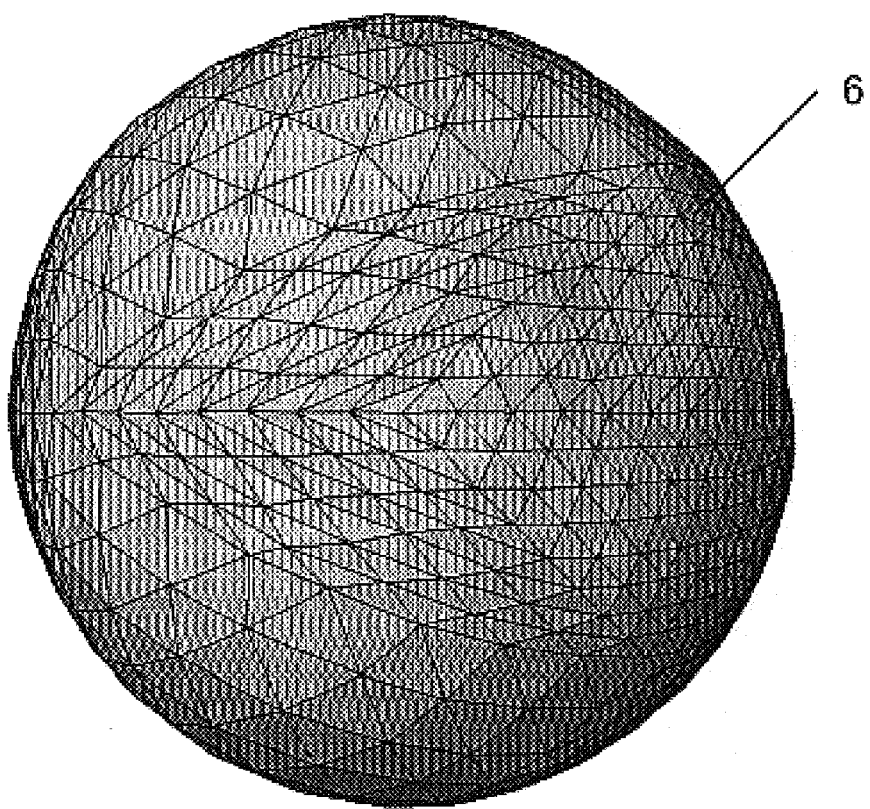
FIG. 1E illustrates a sphere following the smoothing effect of a second order divided differences operator.
Figure 2A:
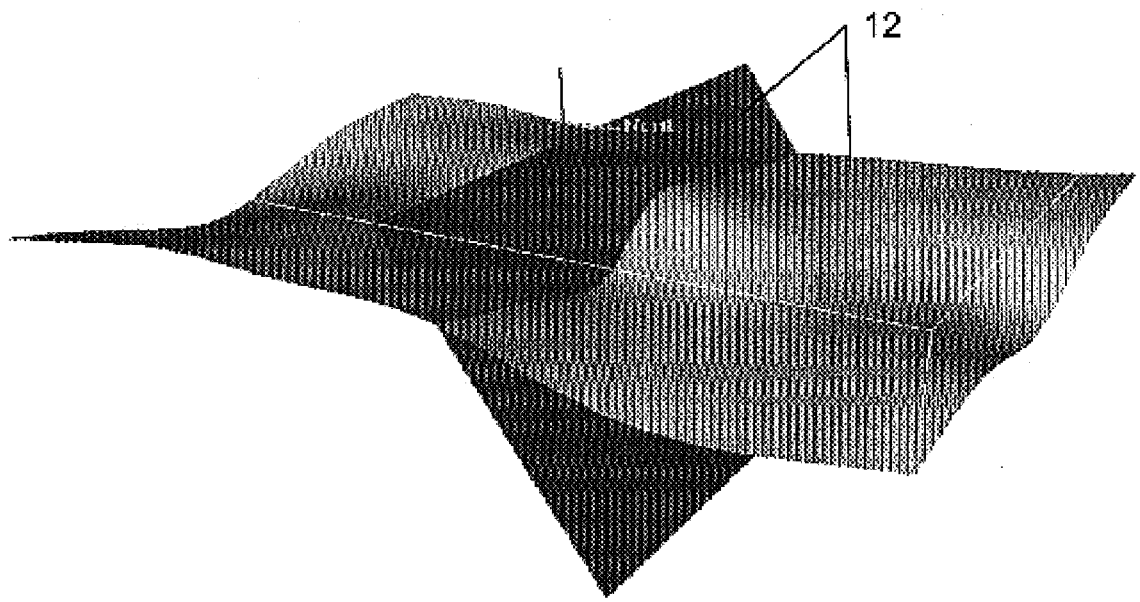
FIG. 2A illustrates a basic non-manifold model.
Figure 2B:
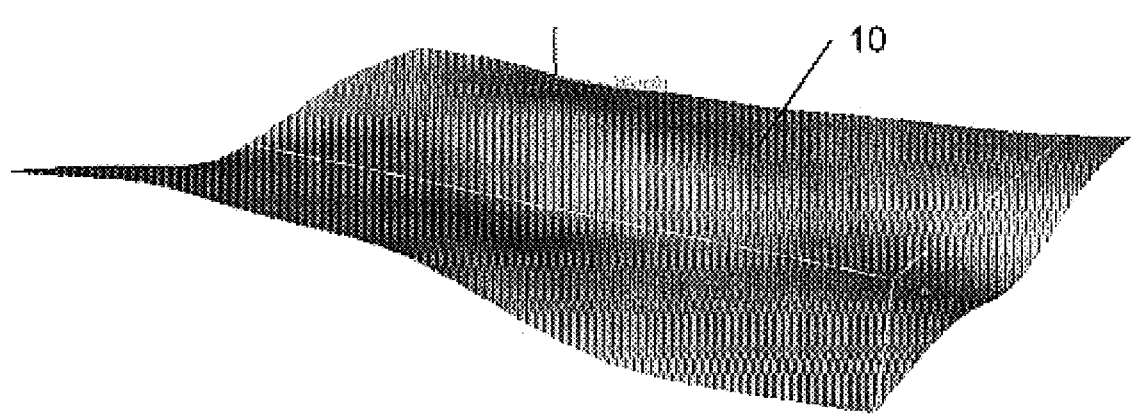
FIG. 2B illustrates a basic two-manifold model.

Specific embodiments of the invention will now be described in detail with reference to the accompanying figures. Like elements in the various figures are denoted by like reference numerals for consistency.

Figure 7:
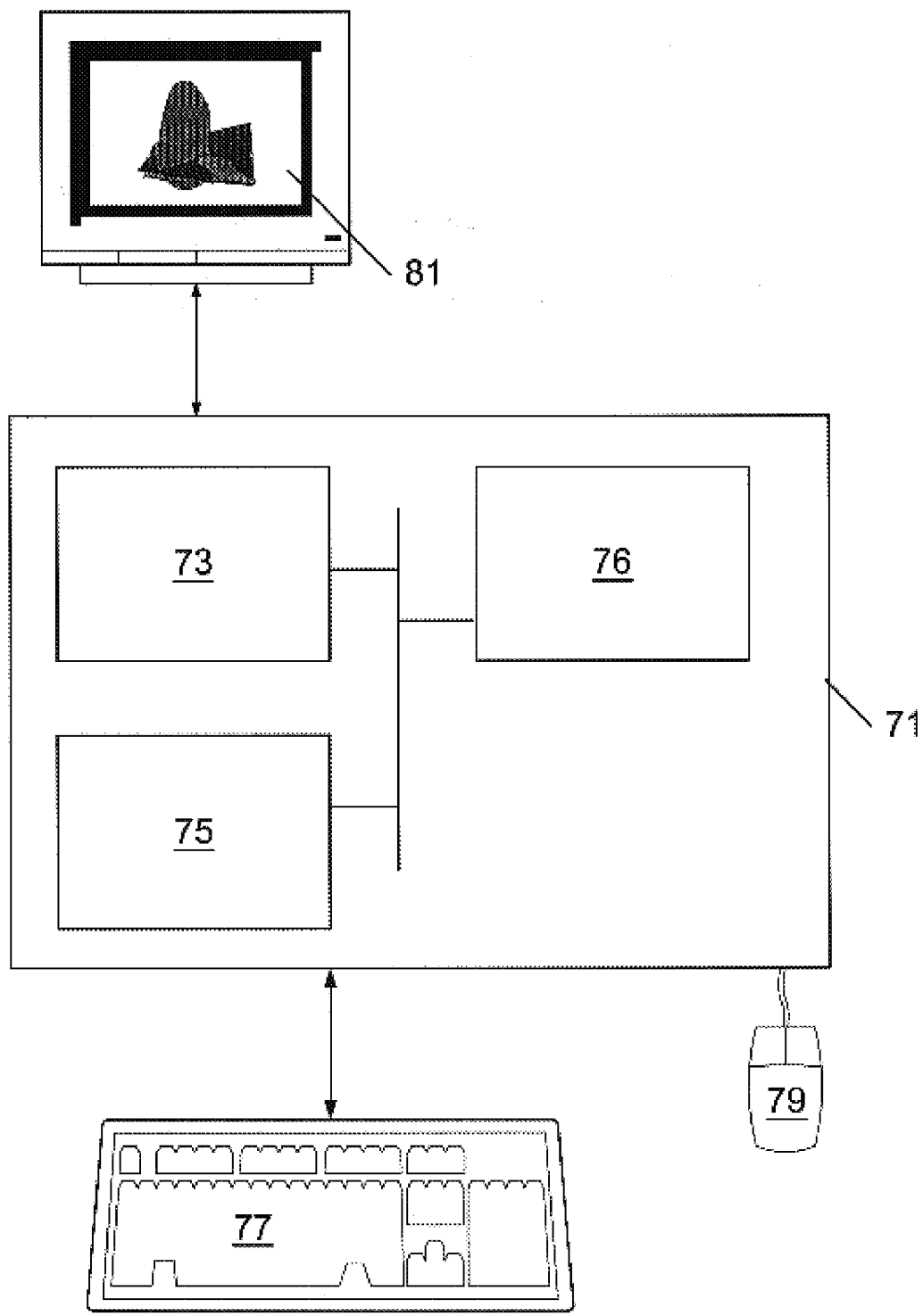
FIG. 7 illustrates a typical computer and its components.

The invention described here may be implemented on virtually any type computer regardless of the platform being used. For example, as shown in FIG. 7, a typical computer (71) comprising a processor (73), associated memory (75), a storage device (76) and numerous other elements and functionalities typical to today's computers (not shown). The computer (71) may further comprise input means, such as a keyboard (77) and a mouse (79), and an output device, such as a monitor (81). Those skilled in the art will appreciate that these input and output means may take other forms.

Figure 5A:
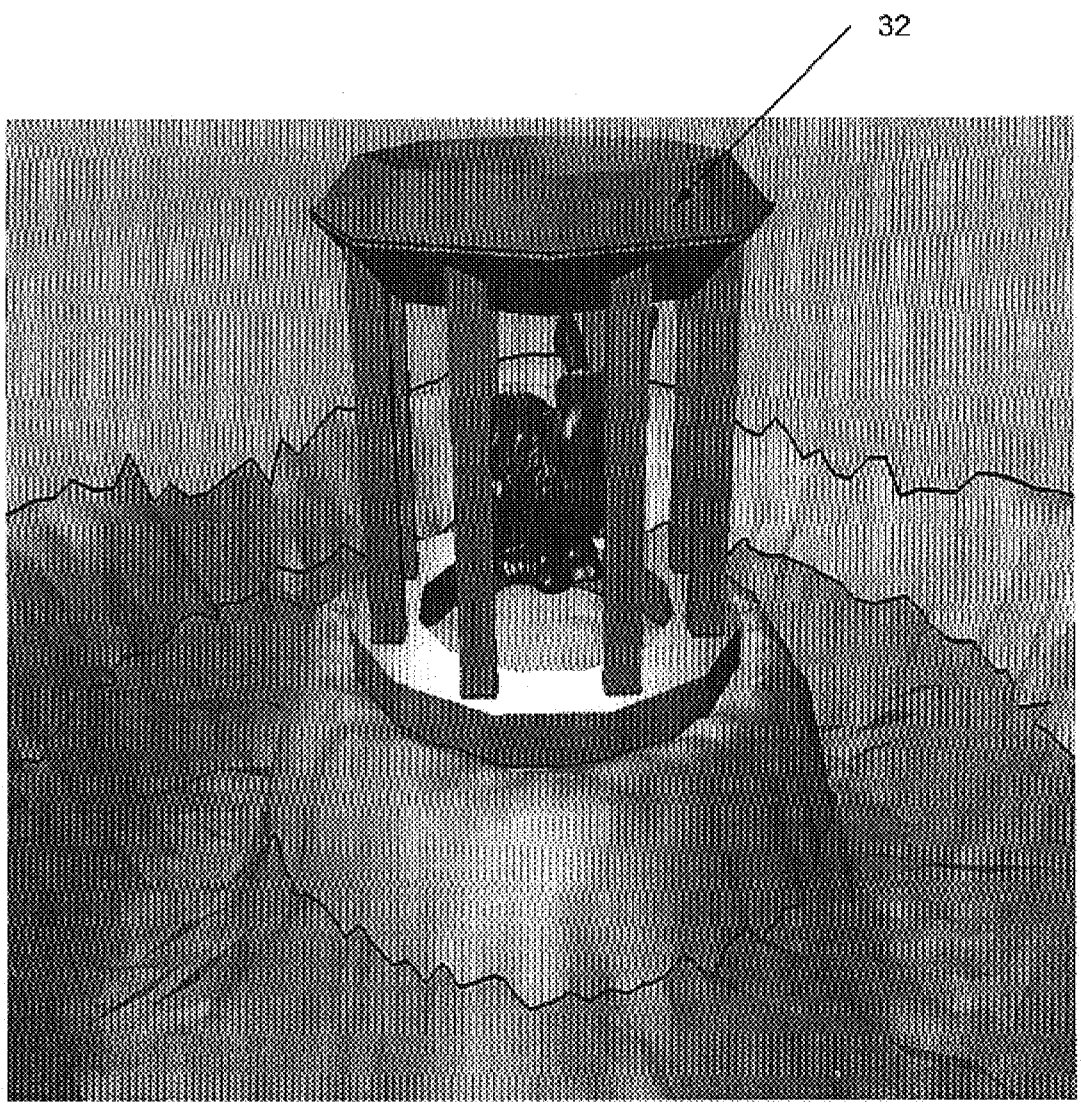
FIG. 5A illustrates a representation of a non-manifold model before fairing.
Figure 5B:
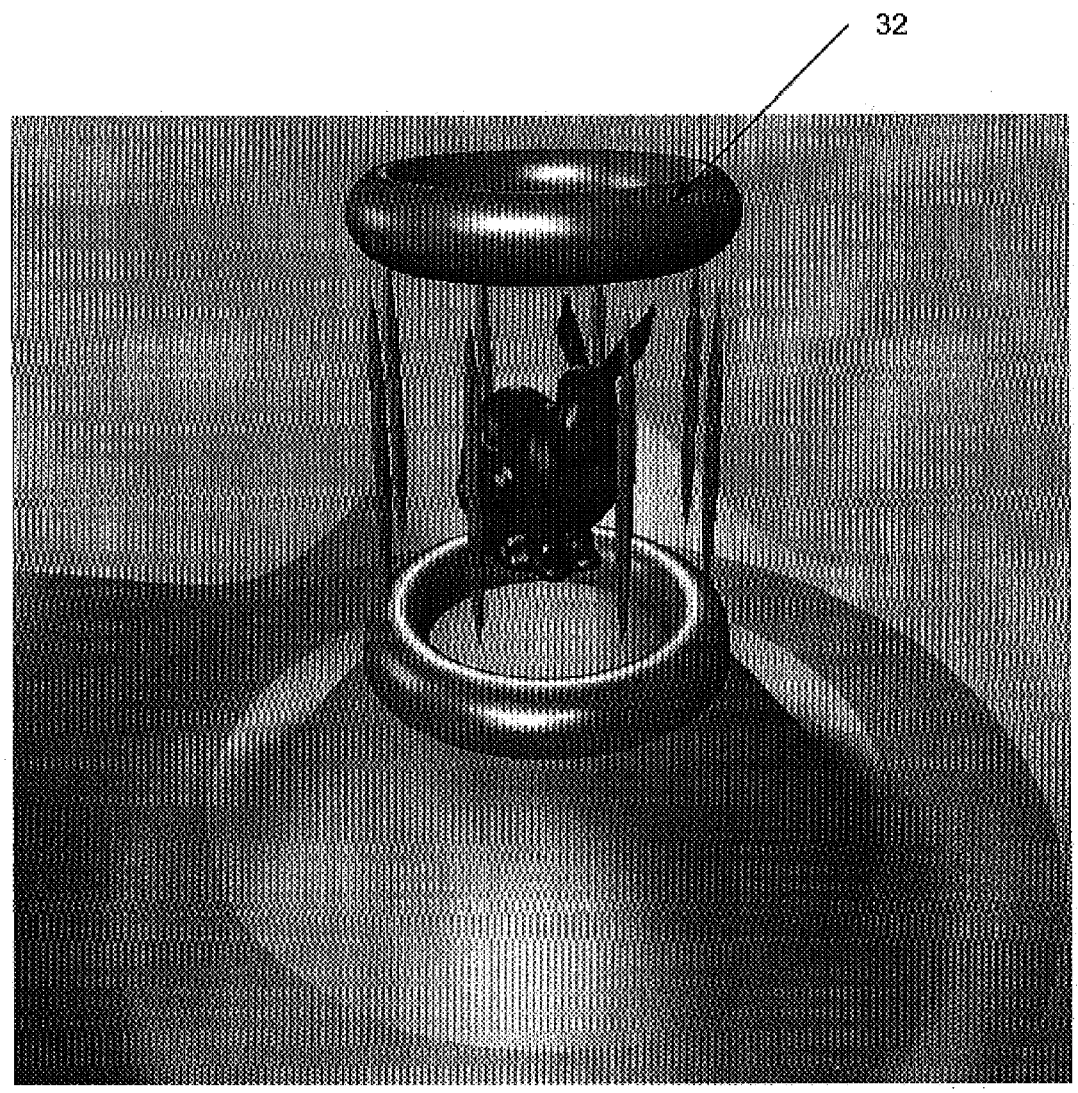
FIG. 5B illustrates a representation of a non-manifold model in which the manifold surfaces are faired independently.
Figure 5C:
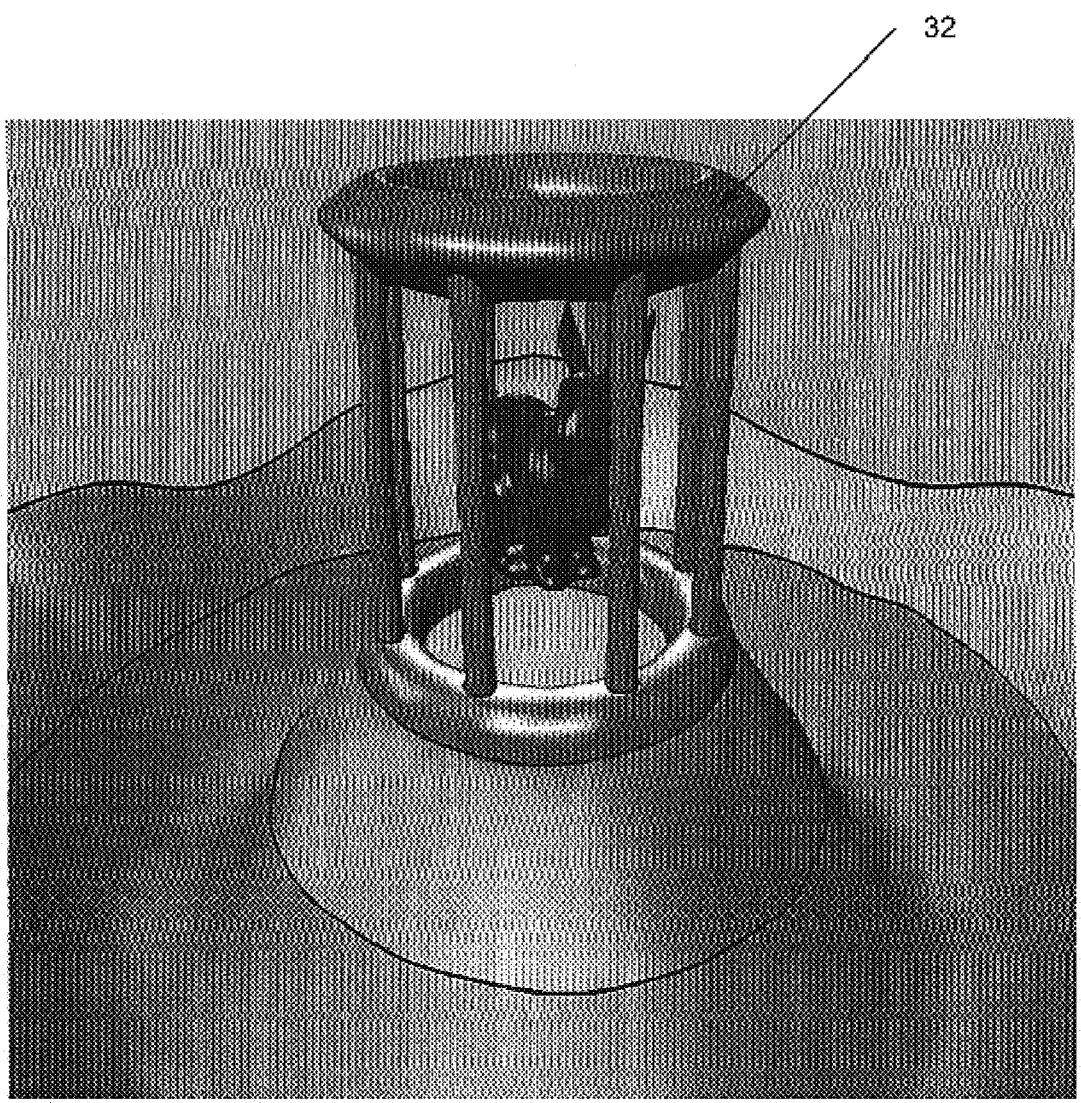
FIG. 5C illustrates a representation of a non-manifold model faired in a non-manifold model-centric setting.

Most fields of computer graphics, such as animation, have concentrated efforts on working with manifold surfaces, since they can be handled more easily. The rationale behind this choice is that the visual quality of a product is of paramount importance. Unfortunately, the topological consistency of a model has not been considered important. However, by abandoning topologically simple models, such as spheres and manifolds, and by tolerating non-manifold geometry, a new dimension of modeling including more of the classical Computer Aided Design (CAD) functionality is brought into graphics modeling. One embodiment of this invention uses non-manifold models (12), as built in an advanced modeling framework to accomplish topologically consistent multi-resolution fairing. As an example, FIG. 5A depicts a non-manifold graphics model (12) before fairing. Referring to FIG. 5B, if manifold surfaces are faired independently, severe artifacts become visible. For instance, water does not wash against terrain and the top and bottom of the shrine (32) are not connected to the columns. Referring to FIG. 5C, if the same model is faired in a non-manifold model-centric setting, the topological type of the model is preserved, and some of its features, such as the shape of the top of the shrine (32) are better preserved.

A significant step towards model-centric graphics is this creation of advanced editing frameworks that build multi-resolution hierarchies directly from triangle meshes. These frameworks allow users to interactively edit and manipulate meshes at different level of resolution. A key ingredient of these frameworks is discrete mesh fairing, applying signal processing techniques to meshes. One embodiment of the invention addresses applying fairing to non-manifold models (12) built in an advanced modeling framework, generally, and for the models to be displayed on a computer monitors (81).

Figure 6A:
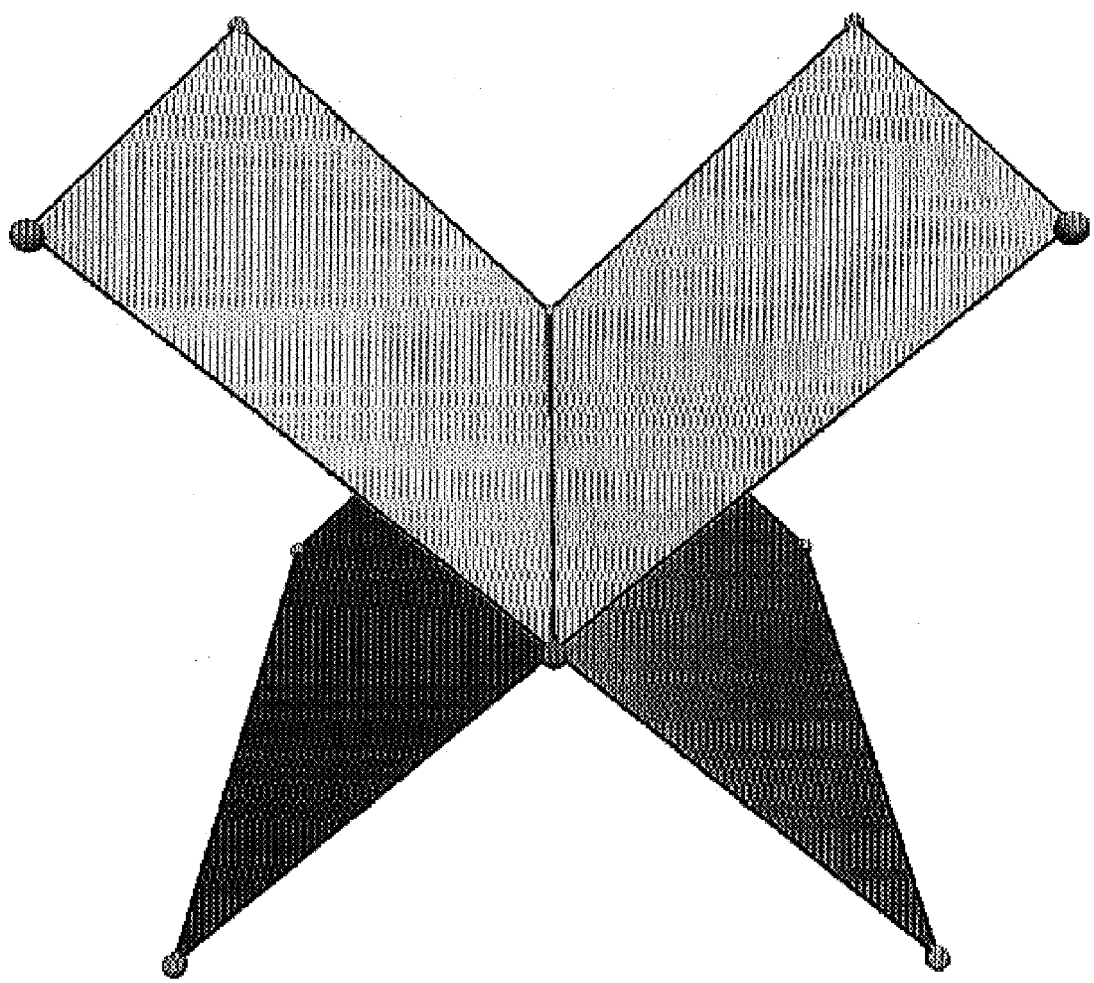
FIG. 6A illustrates an intersection of two triangle meshes.
Figure 6B:
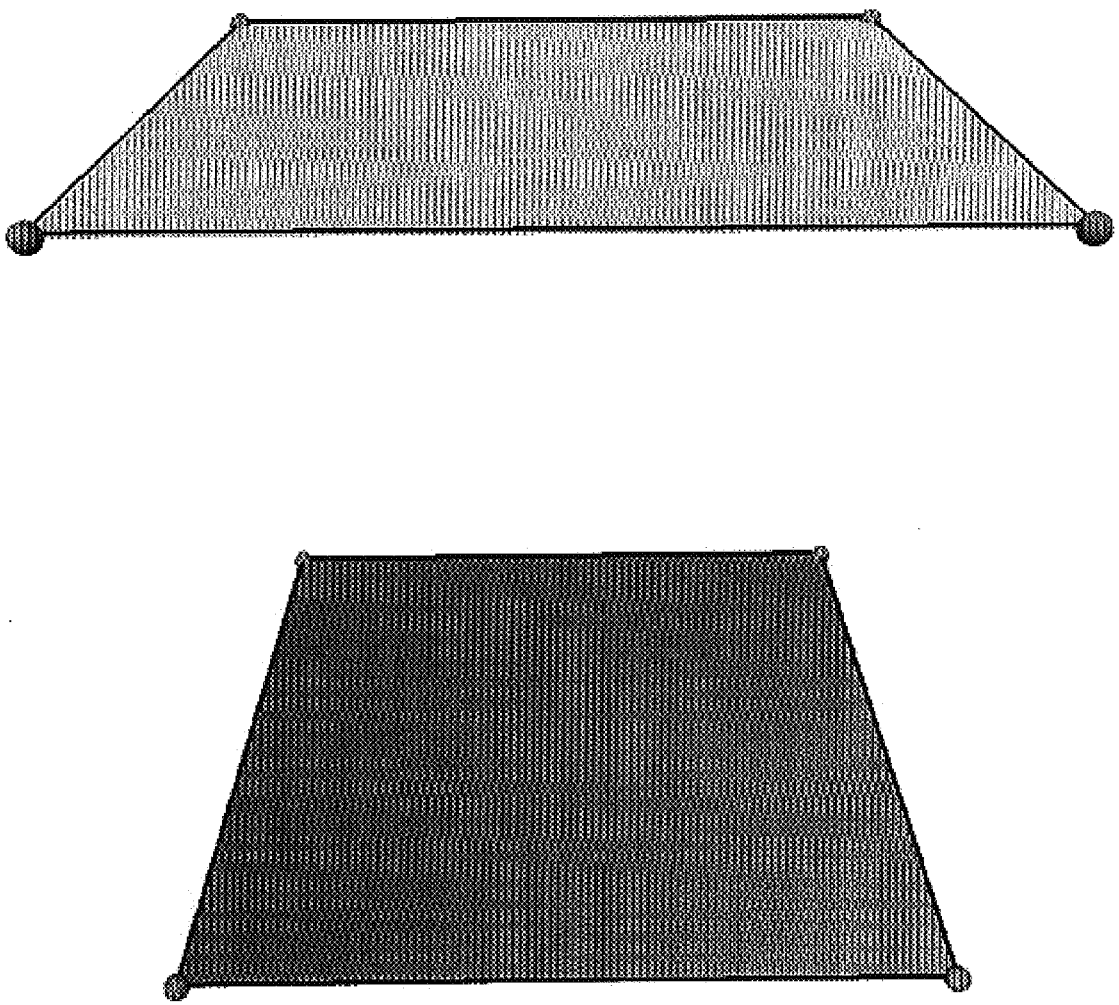
FIG. 6B illustrates a result of a fairing operator applied to two meshes which were intersected.
Figure 6C:
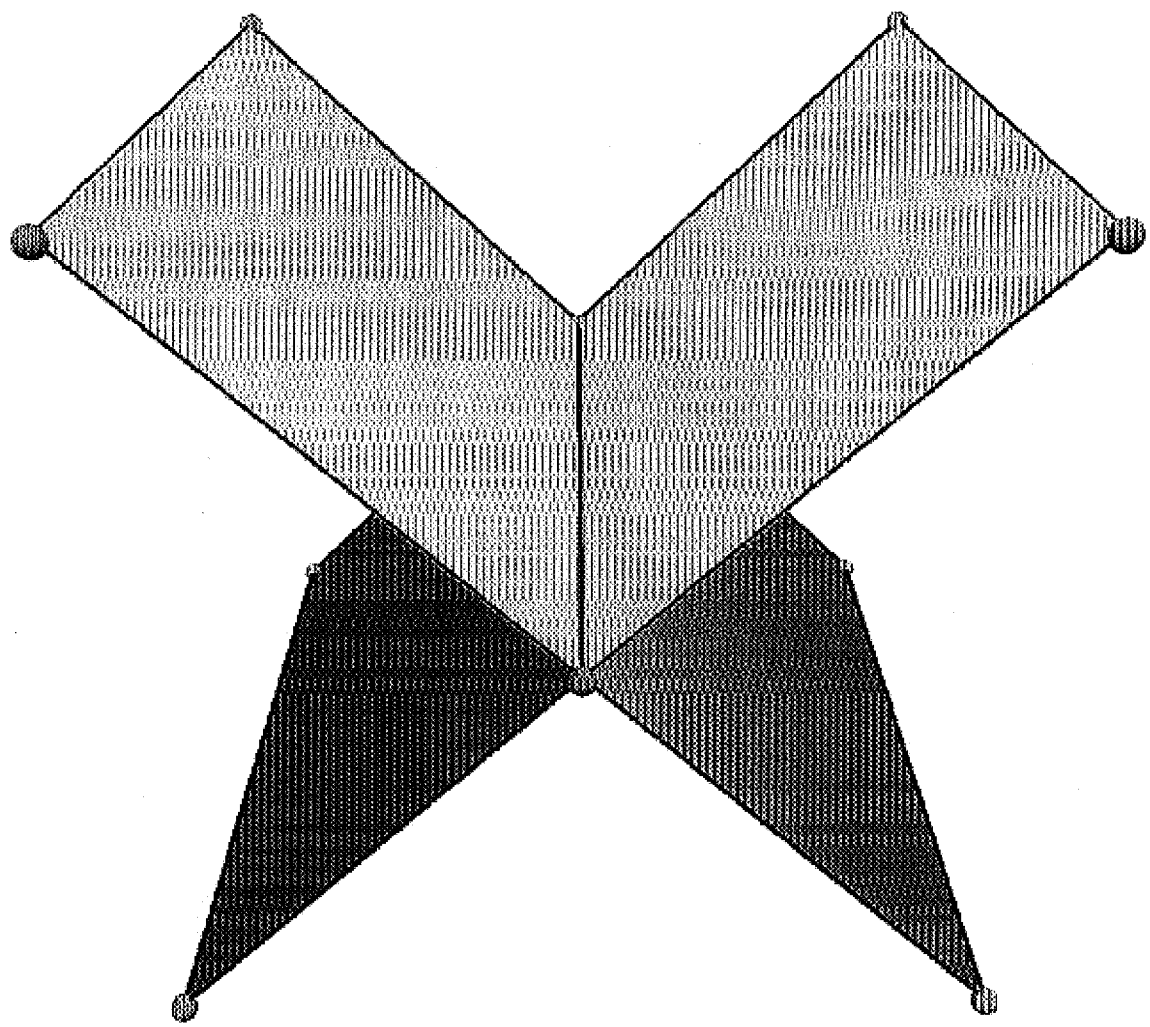
FIG. 6C illustrates a result of a fairing operator applied to two meshes which were intersected that generates a non-smooth version.
Figure 6D:
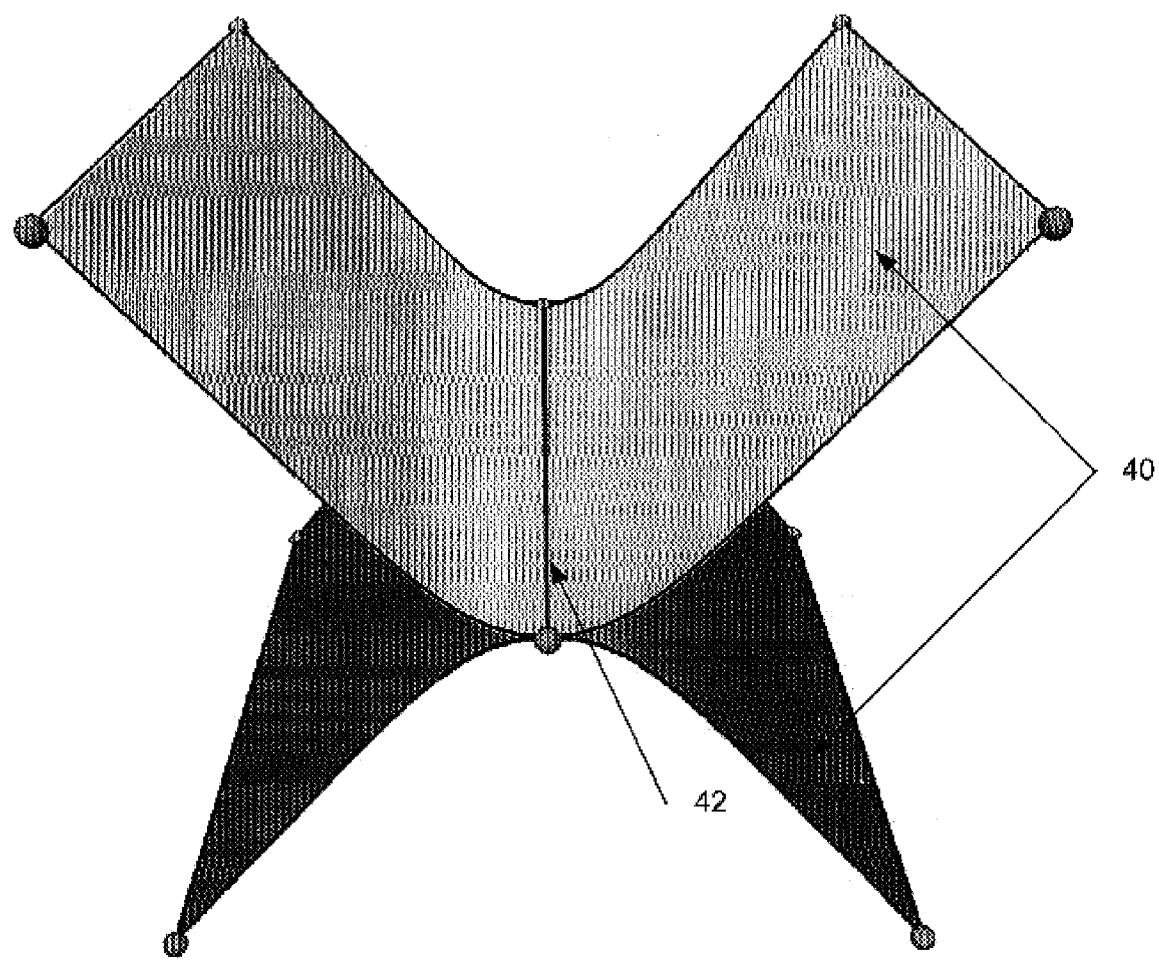
FIG. 6D illustrates a result of a non-manifold fairing method applied to two meshes which were intersected in accordance with one embodiment of the present invention to generate a smooth version of the entire model.

To further understand the problem of non-manifold fairing, consider the example given in FIG. 6A, where two triangle meshes intersect. Applying an adaptation of manifold fairing method will either remove the intersection completely (FIG. 6B) or it will generate a non-smooth model (FIG. 6C). The non-manifold fairing method, by contrast, smooths the entire model including two partial surfaces (40) and the intersection line (41), as in FIG. 6D. By extending conventional fairing operators to non-manifold models (12), the invention provides a framework that can be used to build advanced multi-resolution representations supporting constraints and other useful functionalities. Fairing non-manifold models (12) approaches a system capable of automation. The ramifications of one embodiment of the invention may be to extended to use in the geological, geophysical, medical and internet arenas.

Figure 3:
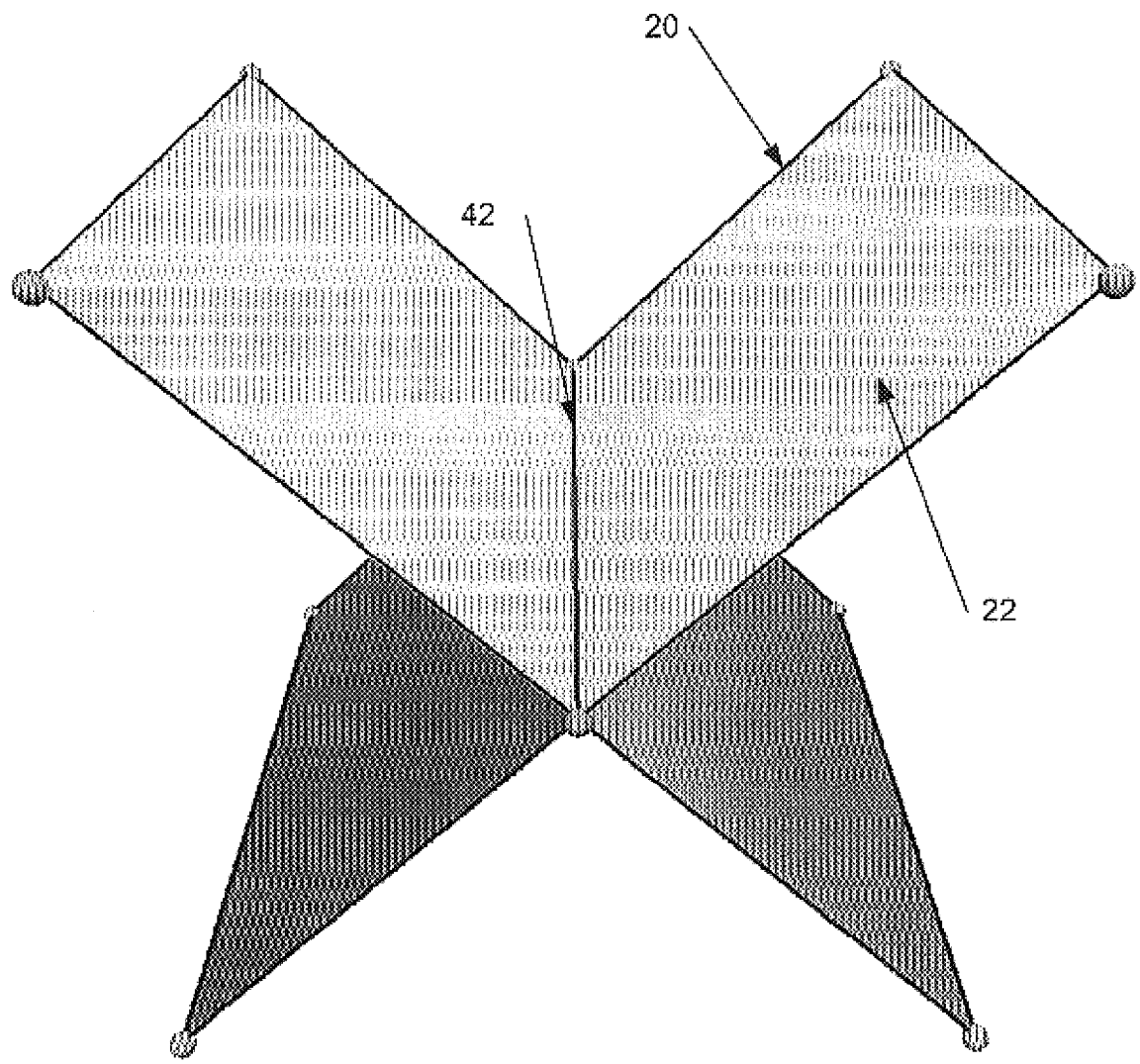
FIG. 3 illustrates a depiction of a one-feature and a two-feature of a non-manifold model.
Figure 4:
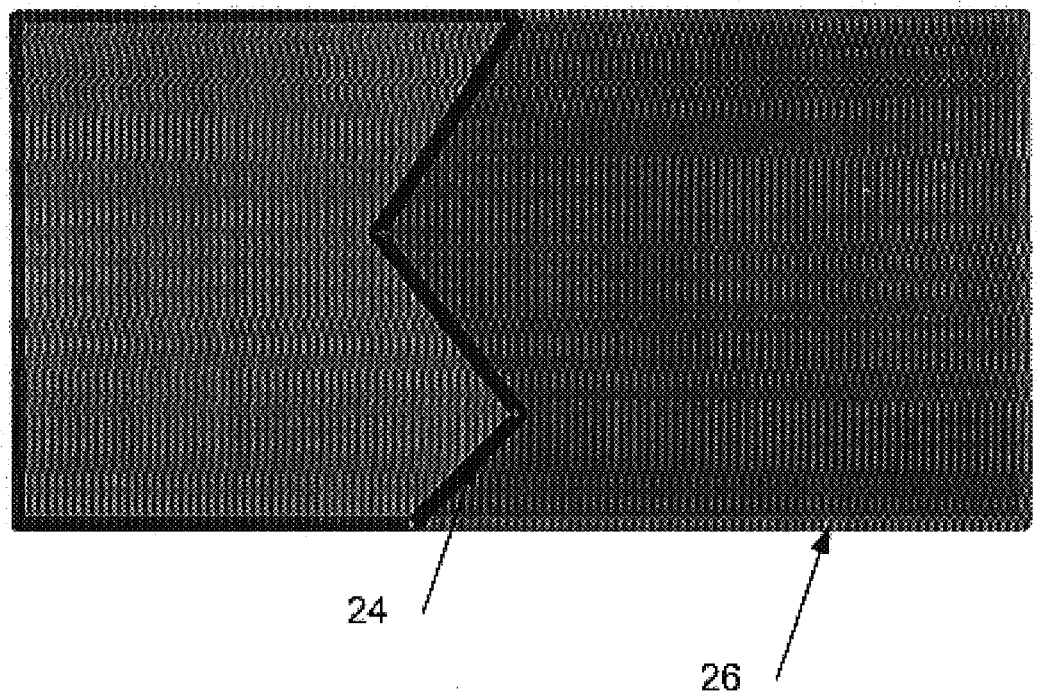
FIG. 4 illustrates a depiction of a 1-seam and a 1-limit.

Model-centric fairing is an approach to smooth non-manifold models (12). It involves smoothing both two-features (22) and one-features (20) while achieving cross-1-seams smoothness. A two-feature (22) is defined a subset of triangles, forming a manifold from a model. A one-feature (20) is piecewise linear curves defined in one or more two-features (22). Intersection and boundary curves are examples of one-features (20). A zero-feature (50) is a vertex in a model that must be interpolated. Vertices shared by two or more one-features (20) are examples of zero-features (50) as shown in FIG. 3. Any vertex may be forced to be a zero-feature (50) and any one-dimensional curve may be forced to be a one-feature (20). A 1-seam (24) is an embedded curve with cross-smoothness while a 1-limit (26) is an embedded curve without cross-smoothness as shown in FIG. 4. An approximation of a Laplacian operator is used as a fairing operator for this embodiment of the invention, but other fairing operators may be used as well.

To smooth non-manifold models (12) is to fair all two-features (22) and all one-features (20) while interpolating zero-features (50) and guaranteeing cross-1-seams smoothness. This can be achieved by constructing an advanced modeling framework on top of any conventional manifold smoother. The algorithmic flow of the resulting method is similar to a flow of conventional smoothing algorithms, and is summarized by this pseudo-code fragment. A step 1 and a step 2 is as follows:

```
Step 1
for n from 1 to 2 do
    for all n-features nF in the model
        for all vert in nF which are not in a 1-limit of nF do
            nDLapl[n-feature][vert] = nDLaplacian (vert);
Step 2
for n from 1 to 2 do
    for all n-features nF in the model do
        for all vert in nF do
            if vert does not belong to a m-feature with m<n
                docomputeNewPos (vert, nDLapl).
```

In a first step, an approximation of the Laplacian operator is computed for all vertices in the model. A two-dimensional Laplacian operator is computed for all vertices that do not lie in a 1-limit (26), and a one-dimensional Laplacian operator is computed for all vertices that are not 1-limits (26) in one-features (20). It might be necessary to compute multiple Laplacian operators for a single vertex, such as for vertices in a 1-seam (24), where both the one-dimensional and the two-dimensional Laplacian operators are needed. The first step in the pseudo-code algorithm may be computed using any fairing operator.

An important feature of the advanced modeling framework is the function computeNewPos in a second step, where a new position $x_i'$ for all vertices i must be computed. The new position $x_i$ for a vertex i is chosen as to minimize a weighted sum of a Laplacian $\Delta x_i$ and a Laplacian $\Delta x_j$ of a plurality of vertices $x_j$ in a one-ring of $x_i$, thereby increasing the support of the vertices in the model. A plurality of zero vertices in the model are interpolated, and vertices that belong to the one-feature (20) are smoothed with the one-dimensional Laplacian operator, and the remaining vertices are smoothed with the two-dimensional Laplacian operator. Depending on the choice of an underlying fairing operator different functionals are minimized.

The basic principle for the second step is to increase the support of a vertex $x_i$, so that during the fairing process it will not only minimize its own Laplacian $\Delta x_i$, but also the Laplacian $\Delta x_j$ of its neighboring vertices $x_j$. Formally, the new position $x_i'$ of a vertex i is computed using equation (10) for vertices in one-features (20) and equation (11) for the remaining vertices that do not lie on any 1-seam (24) or 1-limit (26).

$$x'_i = \text{argmin}((\omega_{i,i} \cdot \Delta x_i)^2 + (\omega_{i,l} \cdot \Delta x_l)^2 + (\omega_{i,r} \cdot \Delta x_r)^2) \quad (10)$$

$$x'_i = \text{argmin}\left(\sum_{j \in N_l(i)} (\omega_{i,j} \cdot \Delta x_j)^2 + (\omega_{i,i} \cdot \Delta x_i)^2\right) \quad (11)$$

where l and r are indices of vertices to the left and right of $x_i$ in the one-feature (20) respectively, and $\omega_{i,j}$ represents a weight associated with the Laplacian $\Delta x_j$ of the vertex $x_j$. The weights control the importance of the curvature of an individual vertex with respect to the fairing process.

Equation (10) and (11) increase the support of the vertex $x_i$. For instance, if the original fairing operator had a support over the one-neighborhood of $x_i$, then (11) extends its support over the two-neighborhood of $x_i$. This is a fundamental property, since it achieves cross-1-seam smoothness without having to move the vertices on the 1-seams (24).

Following is a description how to solve equation (11). A similar approach can be used to derive equation (10). The new vertex position $x_i$ is computed by solving an (n+1)×1 system of equations using a least squares method. The starting point is with the following system of equations:

$$\omega_{i,i}\Delta x_i = 0$$

$$\omega_{i,j_1}\Delta x_{j_1} = 0$$

$$\omega_{i,j_n}\Delta x_{j_n} = 0 \quad (12)$$

This system of equations depicts the ideal solution where all the Laplacian operators are zero. Next, is the creation of a formulation of the Laplacian $\Delta x_k$ for a vertex $x_k$.

$$\Delta x_k = \sum_{j \in N_l(k)} c_{k,j} x_j - x_k \quad (13)$$

This definition is general enough to represent most of the fairing operators. If more advanced operators should be devised in the future, the definition may be extended.

The next step is to construct a linear system of equations from equation (12) using equation (13), which yields:

$$\begin{bmatrix} \omega_{i,i} \\ -\omega_{i,j_1}c_{j_1,i} \\ \cdots \\ -\omega_{i,j_n}c_{j_n,i} \end{bmatrix} \cdot [x_i] = \begin{bmatrix} \omega_{i,i}(\Delta x_i + x_i) \\ \omega_{i,j_1}(\Delta x_{j_1} - c_{j_1,i}x_i) \\ \cdots \\ \omega_{i,j_n}(\Delta x_{j_n} - c_{j_n,i}x_i) \end{bmatrix} \quad (14)$$

Finally, computation of the new position $x_i'$ of the vertex i that best solves (14) with respect to the two-norm is achieved using a least squares approach that yields the normal equation (15):

$$x'_i = x_i + \frac{\omega_{i,i}^2 \Delta x_i - \sum_{k=1}^n \omega_{i,j_k}^2 c_{j_k,i} \Delta x_{j_k}}{\omega_{i,i}^2 + \sum_{k=1}^n \omega_{i,j_k}^2 c_{j_k,i}} \quad (15)$$

Figure 8A:
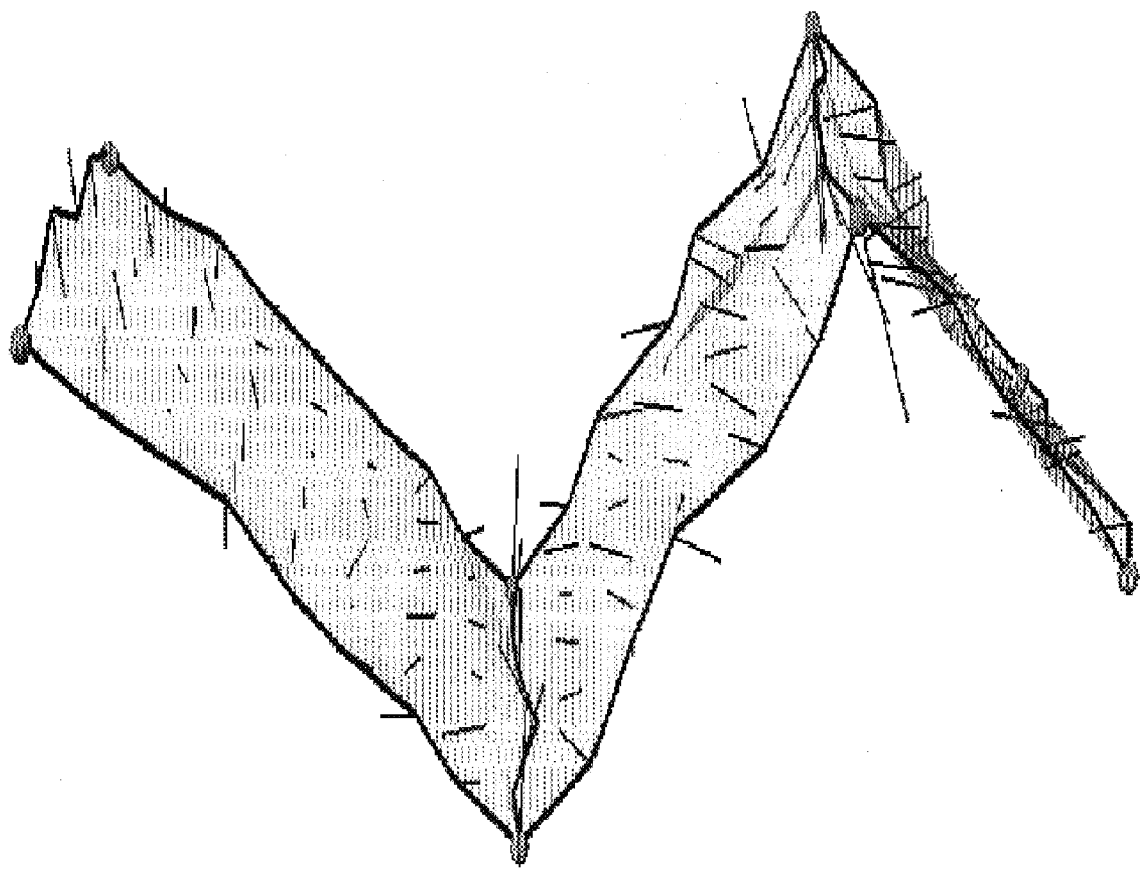
FIG. 8A illustrates magnitude and direction of a Laplacian operator of the fairing functional in accordance with one embodiment of the present invention.
Figure 8B:
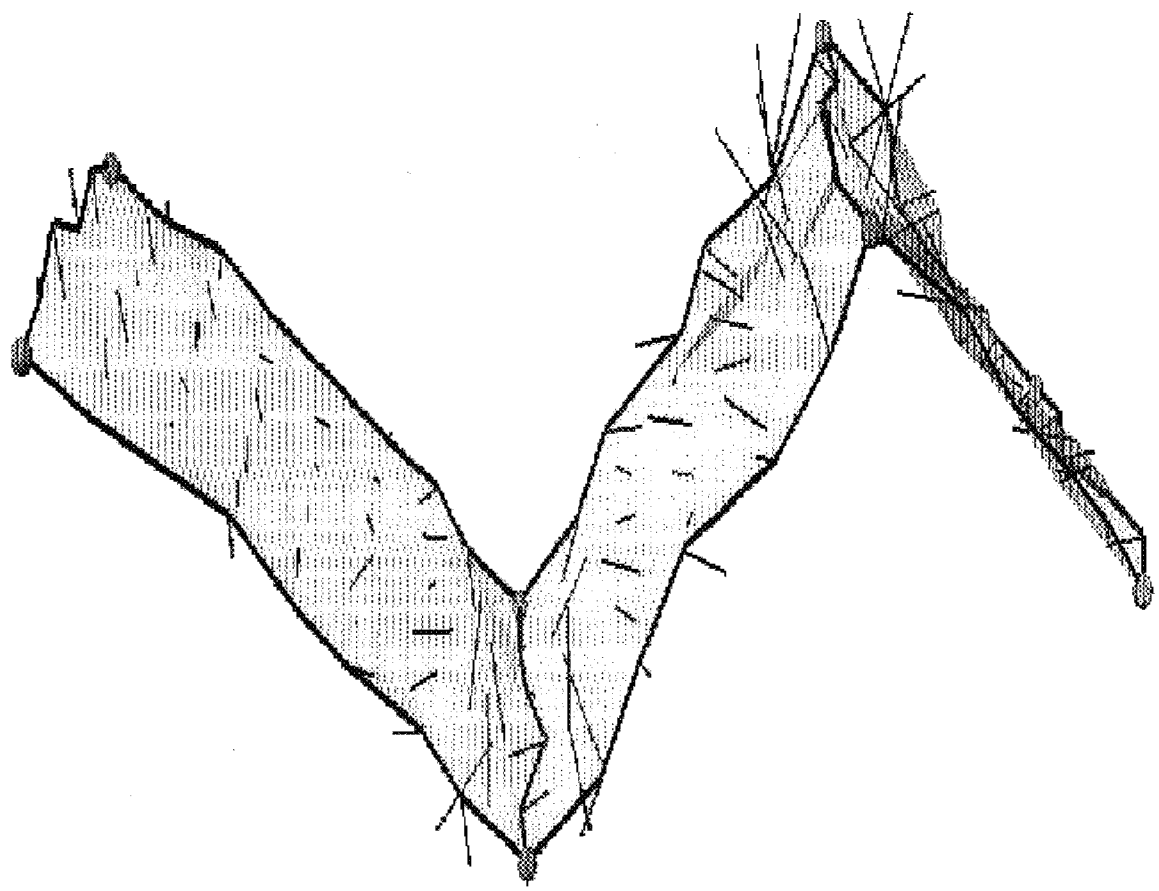
FIG. 8B illustrates displacement of the vertices of the fairing functional in accordance with one embodiment of the present invention.
Figure 8C:
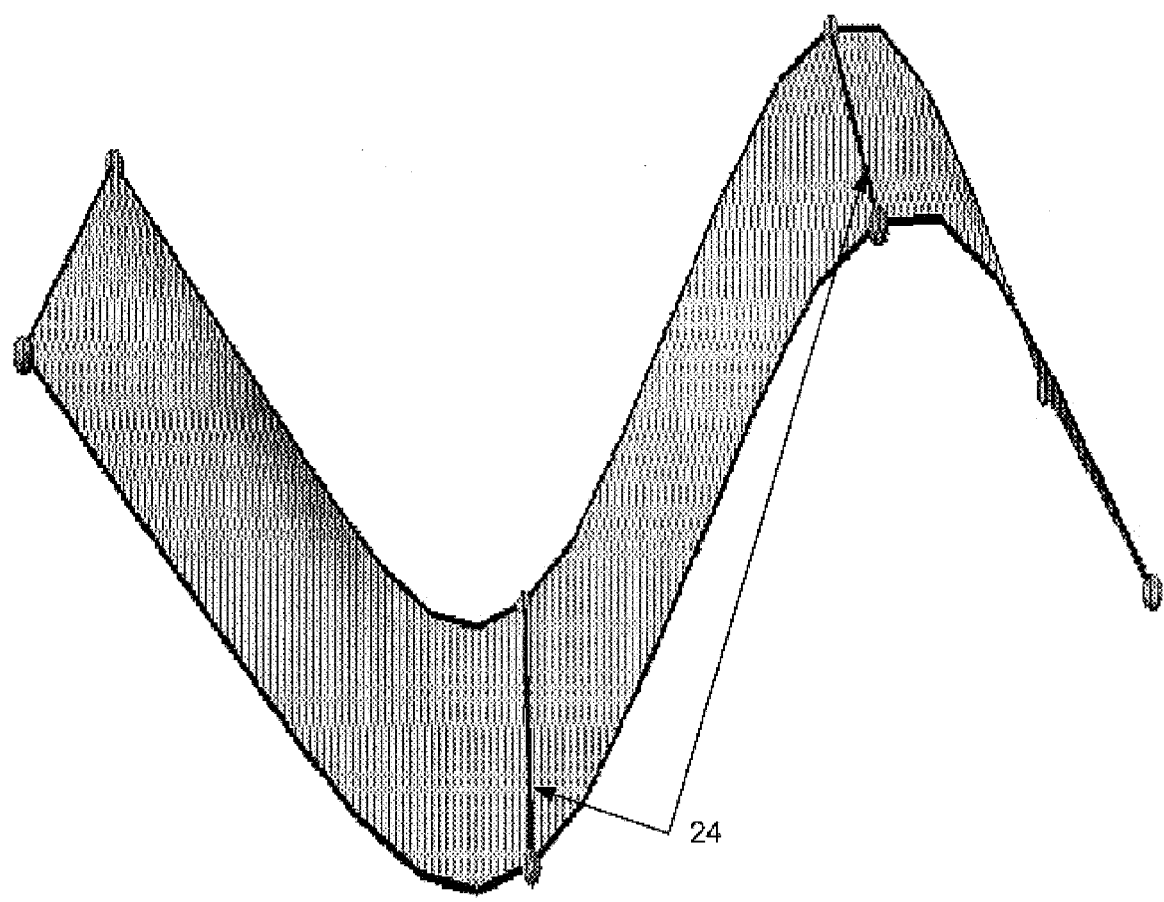
FIG. 8C illustrates smoothed surface that interpolates the 1-seams of the fairing functional in accordance with one embodiment of the present invention.

FIGS. 8A, 8B and 8C help to visualize the ideas behind the fairing functional described above. FIG. 8A shows the magnitude and direction of the Laplacian operator computed at every vertex using a manifold smoother, and FIG. 8B shows the new displacement of the vertices. FIG. 8C illustrates the smooth surface generated by the fairing operator that possesses cross-1-seam smoothness.

One embodiment of the invention involves a strategy to select and compute weights allowing reasonable cross-1-seam smoothness that begins by assigning larger weight values to vertices that are closer to a 1-seam (24) or a zero-feature (50), and smaller weight values to vertices that are farther away. Two steps are used.

In a first step, a distance d for each vertex $x_i$ is computed to the closest 1-seam (24) or zero-vertex. Using a topological measure, the distance between two vertices $x_i$ and $x_j$ equals a minimum number of edges traversed to get from $x_i$ to $x_j$. Next, in a second step, a weight $\omega_i$ for each vertex $x_i$ is computed as a ratio between the distance di and a maximum distance $d_{max}$ of any mesh vertex to a closest 1-seam (24) or zero-vertex whose path goes through $x_i$:

$$\omega_i = W - W \cdot \frac{d_i - 1}{d_{max} - 1} \quad (16)$$

where W is a user specified maximum weight. A linear function is used to model the weights in this embodiment, but any function may be used in its place.

During a smoothing step of a vertex $x_i$, the weights for a vertex $x_k$ are chosen as follows:

$$\omega_{i,k} = \begin{cases} \omega_i/m & \text{if } k \in N_l(i) \text{ and } (\omega_k > \omega_i) \\ 0 & \text{if } k \in N_l(i) \text{ and } (\omega_k \geq \omega_i) \\ (1 - \omega_i) & \text{if } k = i \end{cases} \quad (17)$$

where m is the number of neighbors j of $x_i$ that satisfy $\omega_j > \omega_i$. As a consequence, a new position of the vertex is chosen to minimize its curvature plus a curvature of the vertices that are closer to a 1-seam (24) or to a zero-feature (50).

Real-world models usually have boundaries, i.e. they are created by computing intersections of a set of two-manifolds with boundaries. Boundaries are handled in the same way as any one-feature (20): they are smoothed using a one-dimensional fairing operator, and zero-features (50) are interpolated. This approach guarantees smooth boundaries, and since the boundaries are handled as one-features (20), defining special fairing operators for the case where a neighborhood of a vertex $x_i$ is homeomorphic to $\mathfrak{R}_+^2$ is explicitly avoided.

This embodiment does not apply additional constraints on the boundaries, but boundary constraints may be added. This may be done, for example, by specifying the derivative or the curvature at the boundary vertices. Using this information the boundaries may be treated as 1-seams (24), and approximations of the two-dimensional Laplacian operators may be calculated for boundary vertices.

Additional tools are required to re-construct three multi-representation applications existing in the prior art (a multi-level smoother, a multi-resolution representation for meshes, and a multi-resolution editing tool for meshes with arbitrary connectivity) to be applied for use on non-manifold models (12). In one embodiment of the invention, the tools constructed are an edge collapse operator and a prolongation operator P.

Figure 9A:
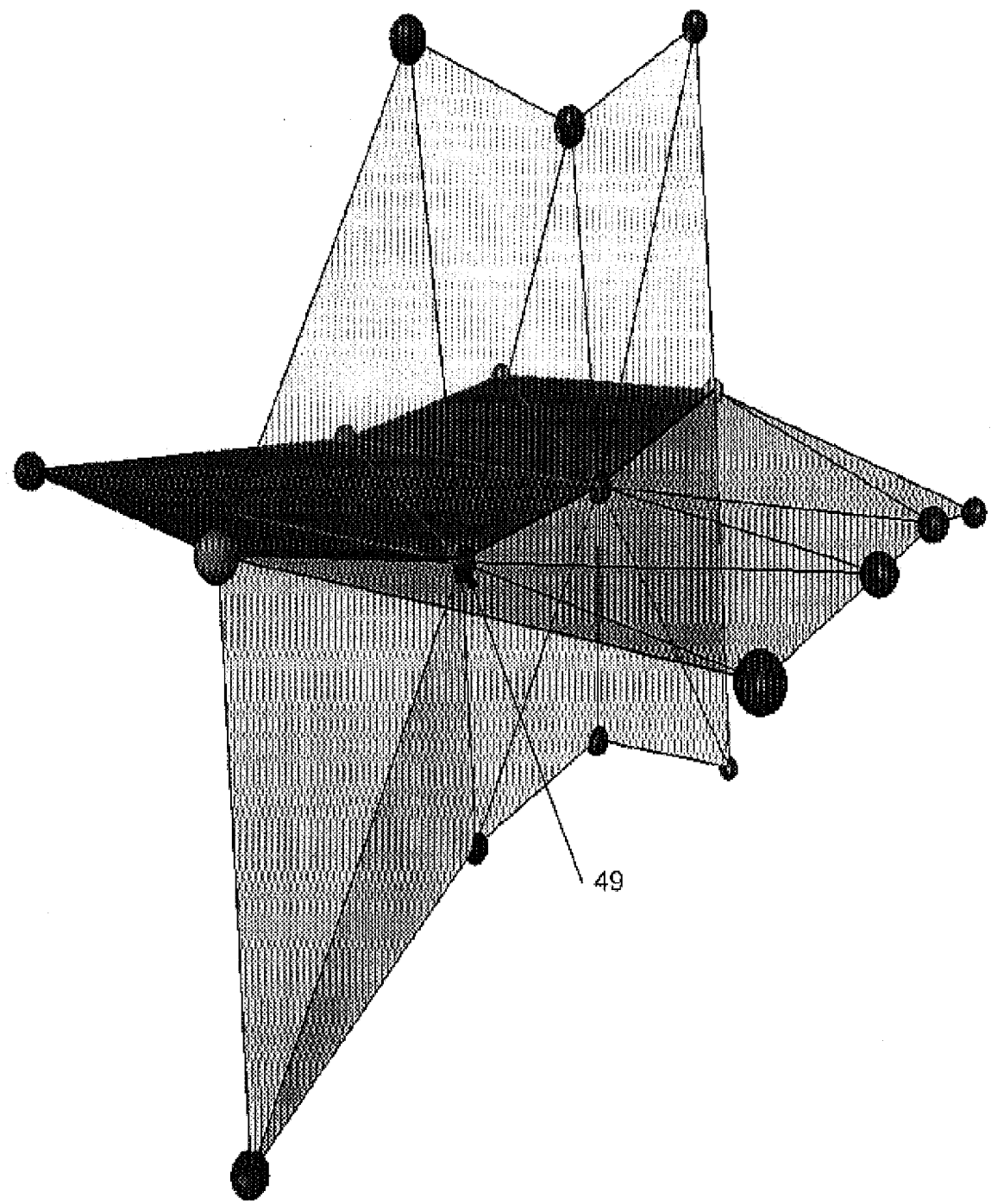
FIG. 9A illustrates a model before an edge collapse of a vertex in a one-feature in a boundary representation in accordance with one embodiment of the present invention.
Figure 9B:
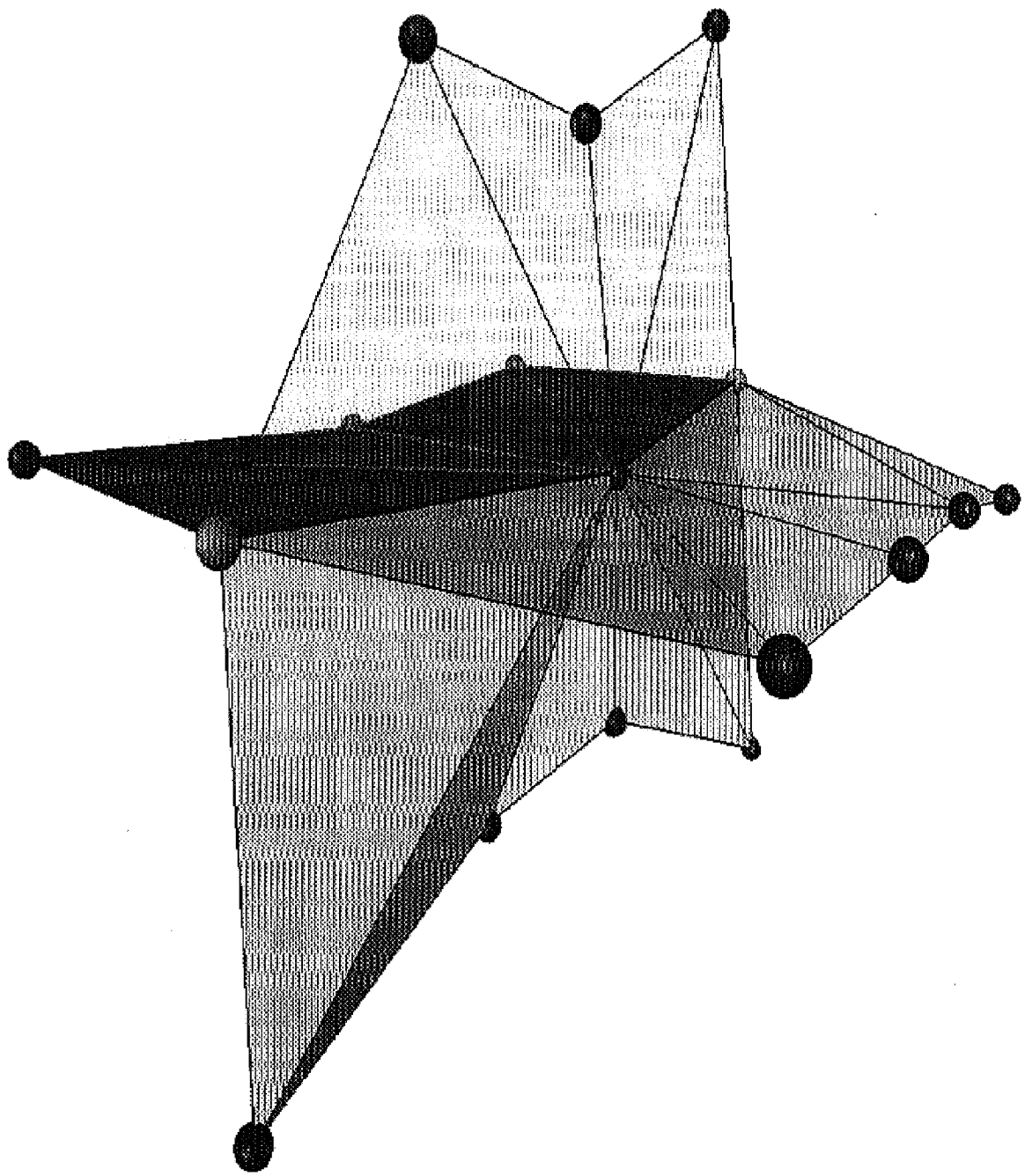
FIG. 9B illustrates a model after an edge collapse of a vertex in a one-feature in a boundary representation in accordance with one embodiment of the present invention.

The edge collapse strategy is extended to meet the underlying boundary representation of the models, namely vertices that do not lie in the one-feature (20) can be removed using the standard edge collapse operator. Vertices in the one-feature (20) must be removed with special care. A vertex $x_i$ in the one-feature (20) can only be collapsed with its left or right neighbor in the one-feature (20). After the collapse, the topology of all two-features (22) sharing the one-feature (20) must be updated. FIG. 9A illustrates a collapse of a vertex (49) in the one-feature (20) in the boundary representation before an edge collapse. FIG. 9B shows the collapse after the edge collapse.

An edge collapse operation may introduce degeneracies into the mesh, such as triangles with a very small area or folded triangles. It is necessary to explicitly check for such degeneracies in order to construct simplified approximations of the models of good quality. A problem of bubbling may occur, where the removal of a vertex (49) from a model introduces new self-intersections in the model.

A prolongation operator P applied to non-manifold models (12) requires that P insert a vertex i into the model at the position $x_i'$ that minimizes both the Laplacian of i and of the vertices $x_j$ in its neighborhood.

A geological model is smoothed using a multilevel approach, implemented as a full V-cycle, which can be described as $$x' = ((I - \lambda K) \cdot P)^n \cdot (Q \cdot (I - \lambda K))^n \cdot x \quad (18)$$

Figure 10A:
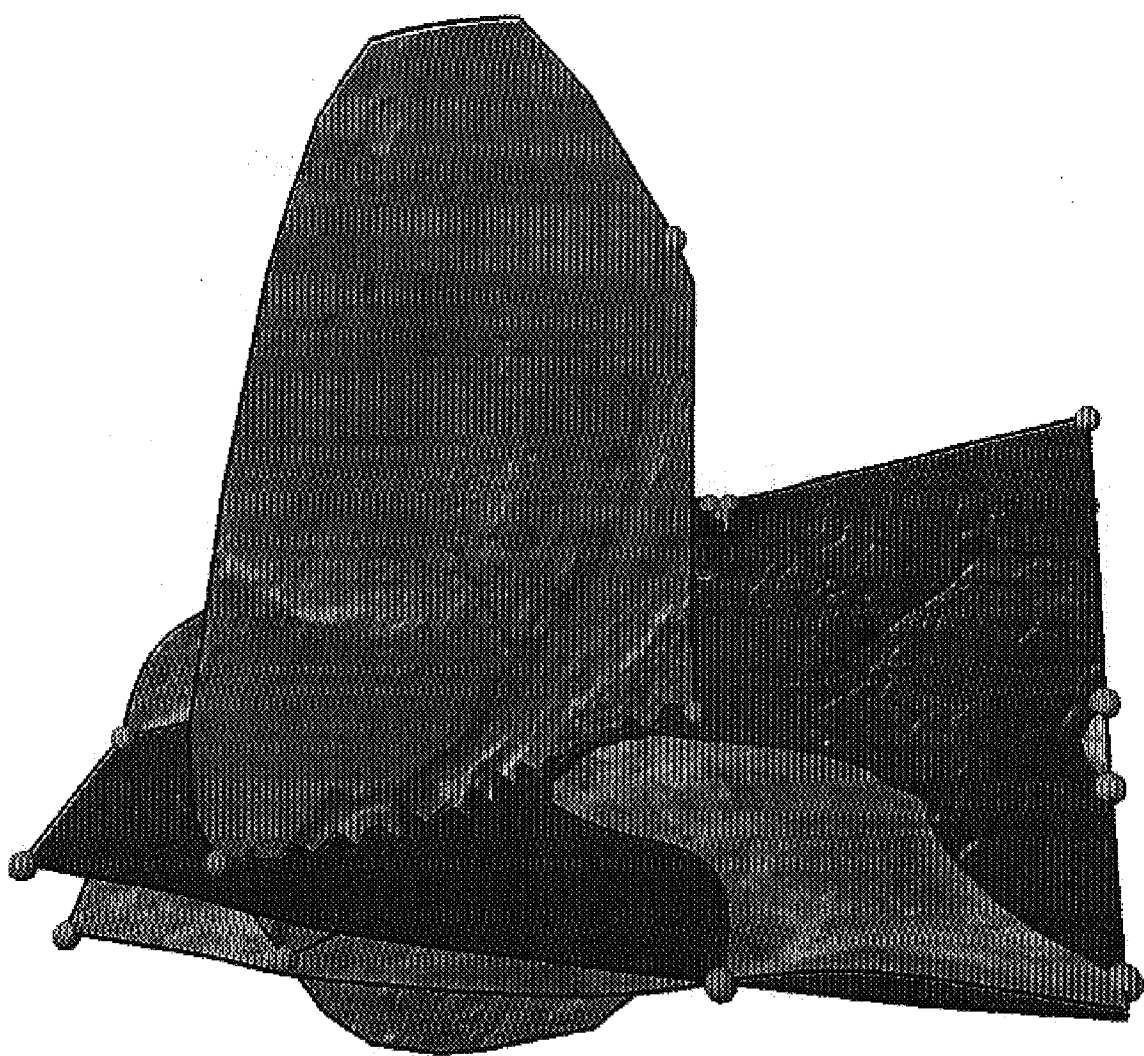
FIG. 10A illustrates an original geological model.
Figure 10B:
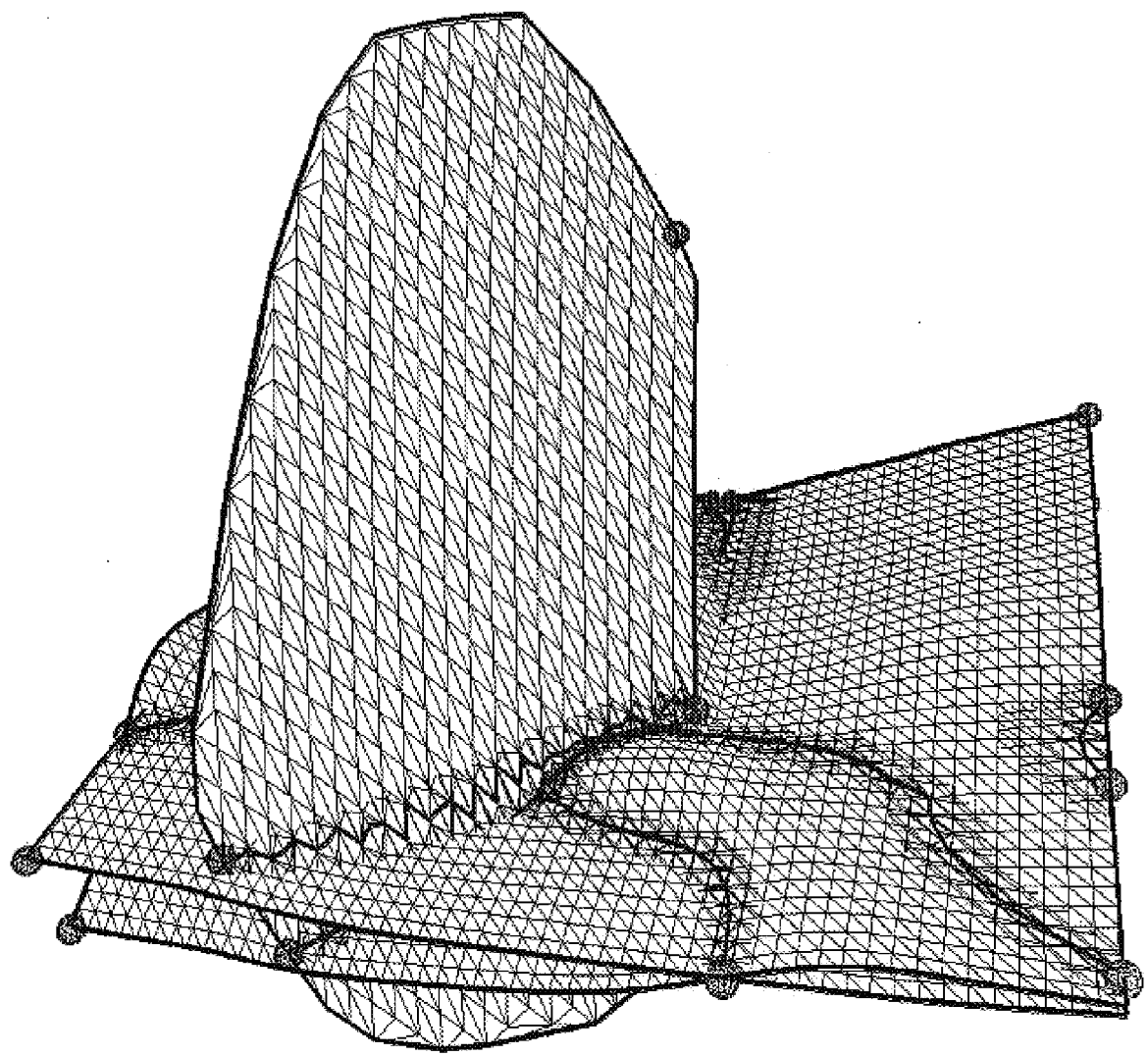
FIG. 10B illustrates a wireframe of the original geological model in accordance with one embodiment of the present invention.
Figure 10C:
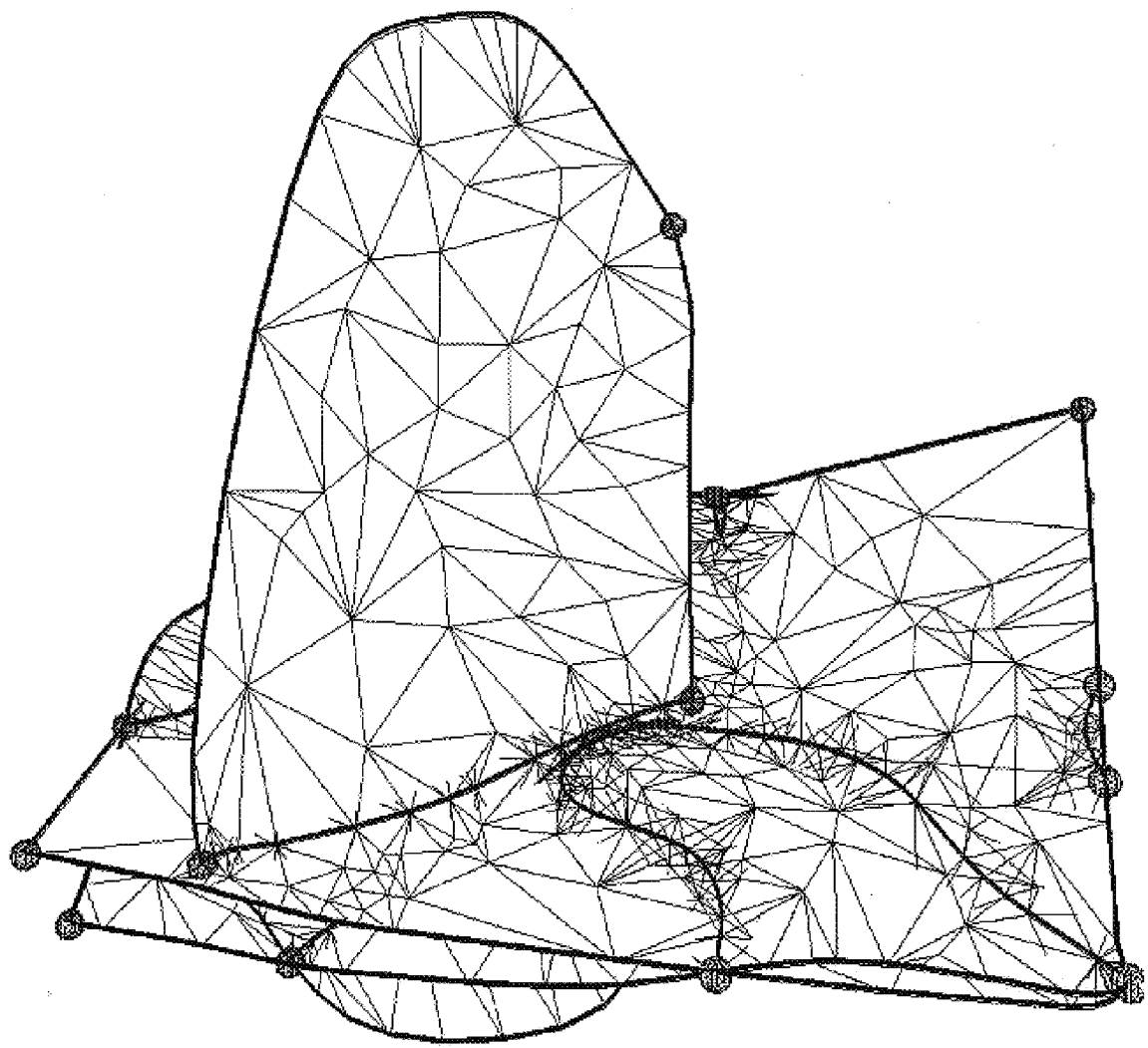
FIG. 10C illustrates a wireframe of the simplified geological model in accordance with one embodiment of the present invention.
Figure 10D:
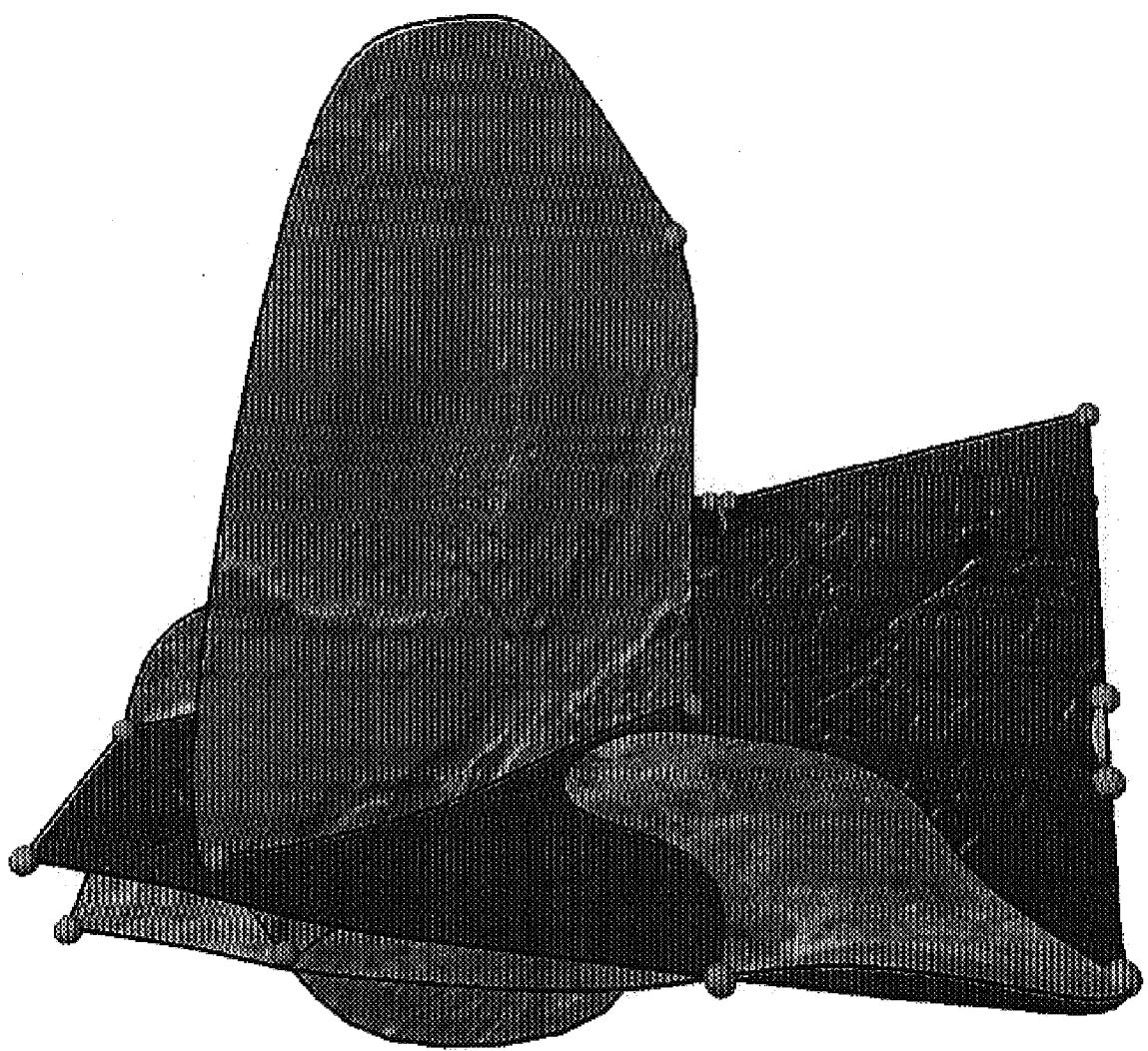
FIG. 10D illustrates a smoothed geological model in full resolution after multi-level fairing of the geological model in accordance with one embodiment of the present invention.

The input mesh x, shown in FIG. 10A as the original model and FIG. 10B as a wire frame of the original model is first smoothed, denoted by $(I-\lambda K)$. Next, the geological model is simplified using an extension of the progressive mesh scheme, denoted by the operator Q. These two operations are repeated n times, until the model is simplified enough (FIG. 10C). The simplified model is then refined using the prolongation operator P, which will re-introduce vertices into the model. After that, the model is smoothed once again. These two operations must also be repeated n times, in order to reconstruct a model that has the same connectivity as the input model. The final result is a smooth model in full resolution as shown in FIG. 10D.

Following are two extensions, namely volume preservation and point and curve constraints, to improve the quality of the fairing procedure. In one embodiment of the invention, these approaches may be applied to standard manifold smoothers as well.

Figure 11A:
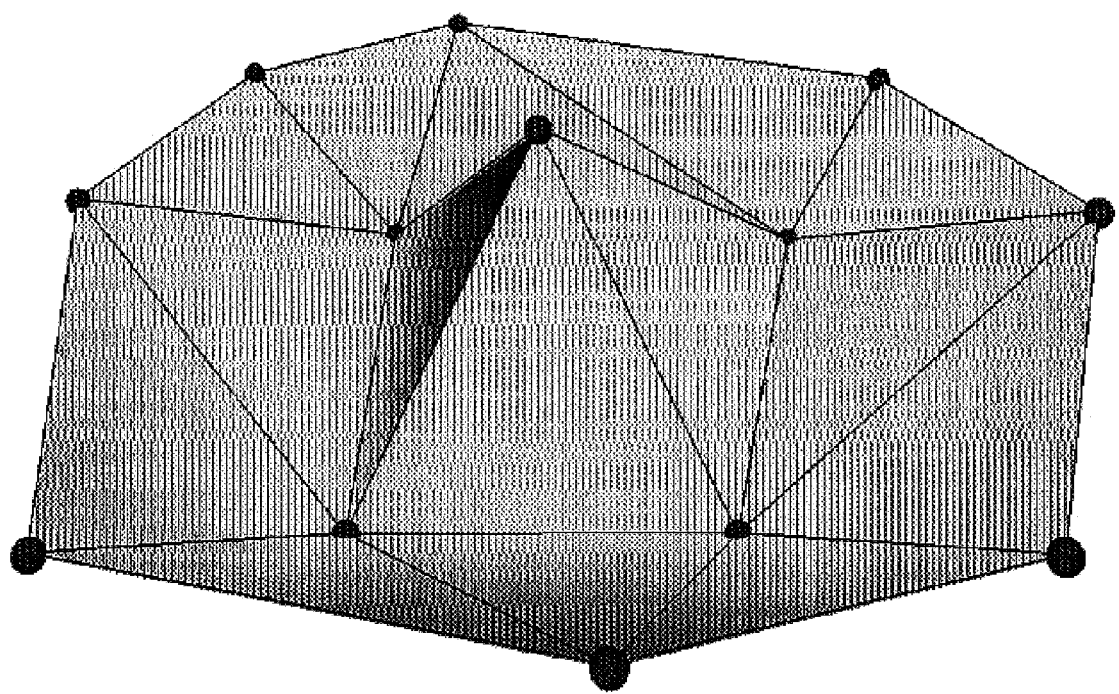
FIG. 11A illustrates a subset of the mesh from a non-manifold model.
Figure 11B:
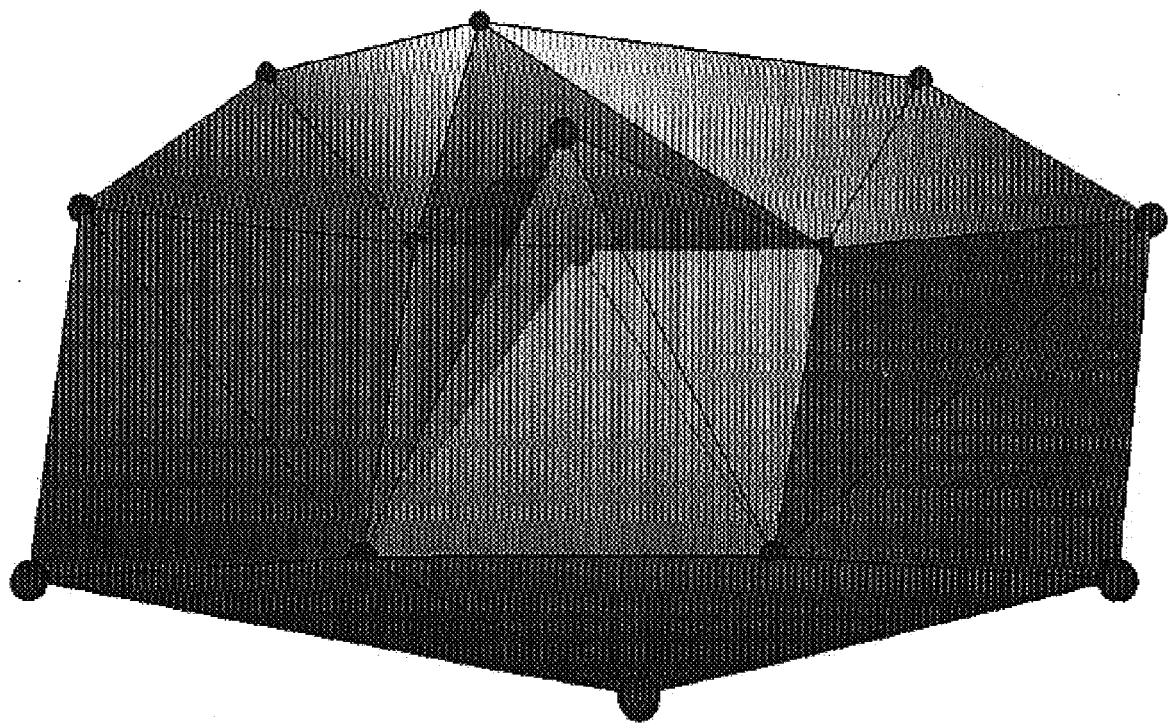
FIG. 11B illustrates local volume preservation where a vertex $x_i$ is smoothed in accordance with one embodiment of the present invention.
Figure 11C:
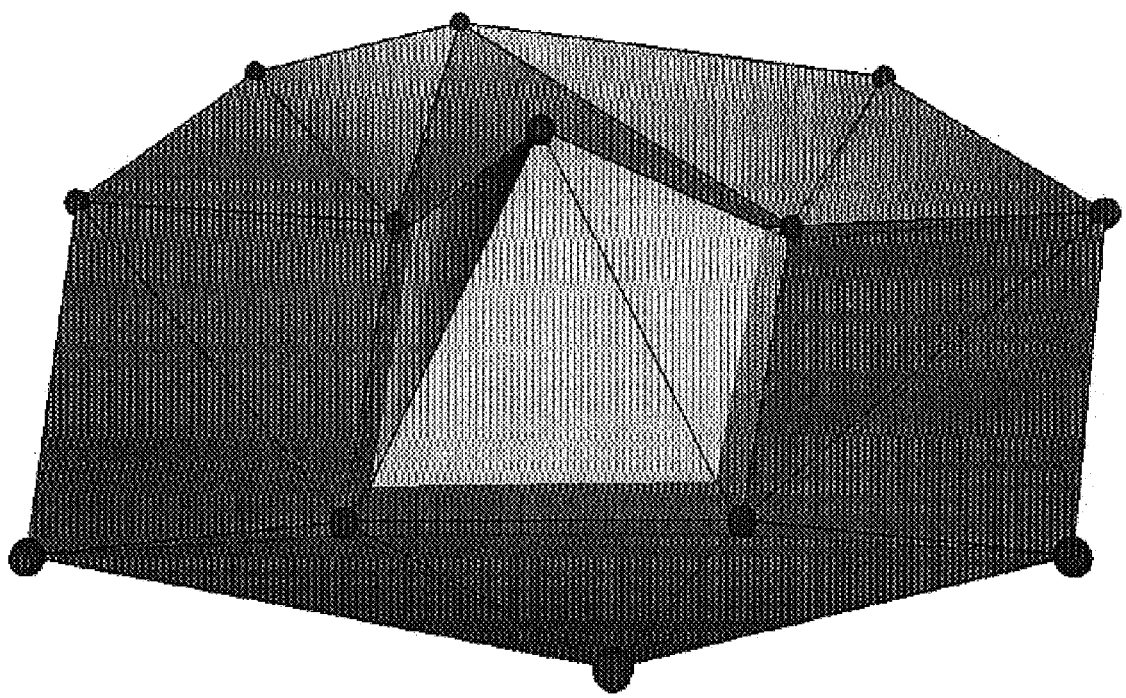
FIG. 11C illustrates local volume preservation where neighbors vertices $x_j$ of $x_i$ compensate for the change in volume in accordance with one embodiment of the present invention.
Figure 11D:
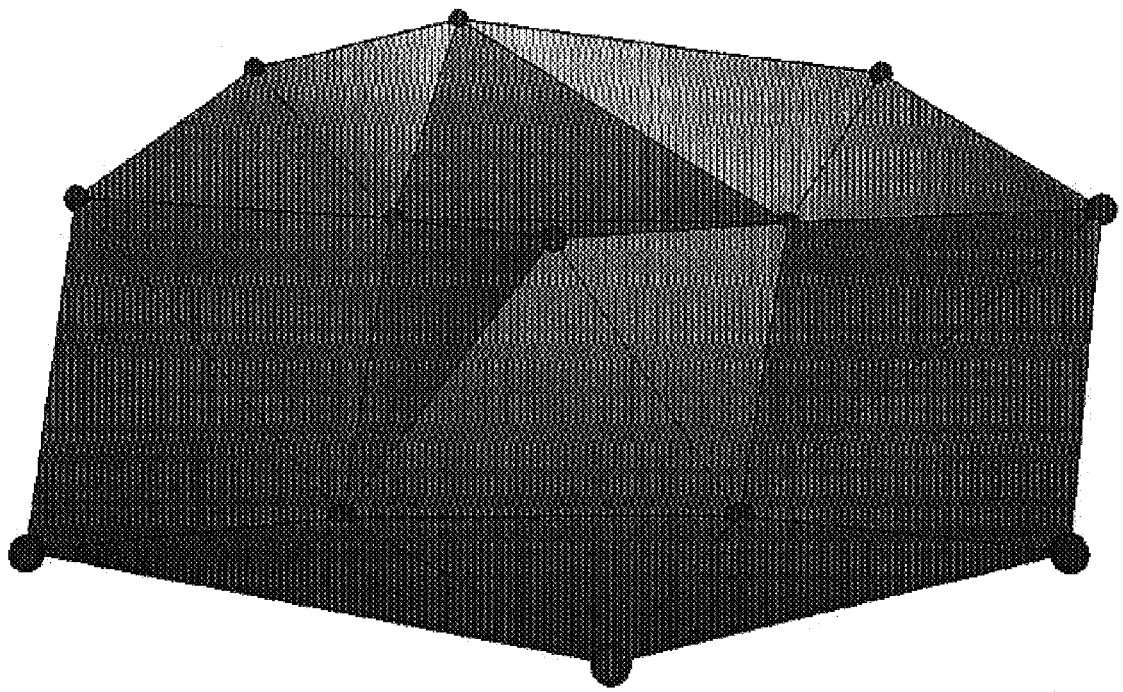
FIG. 11D illustrates a subset of a non-manifold model after fairing and volume preservation in accordance with one embodiment of the present invention.

A first extension is volume preservation. In the prior art, global volume preservation strategies are used. These global strategies are implemented after smoothing and involve a recalculation of a proper volume followed by a correction of the volume at a global level. One embodiment of the invention is a local volume preservation strategy derived from an observation that when a vertex $x_i$ is smoothed the change of the volume $\Delta V$ can be computed locally. This is accomplished by computing the volumes of the tetrahedra defined by the triangles in the one-neighborhood of $x_i$ and the new position $x_i'$ of i. $\Delta V$ can be compensated by moving the vertices in the one-neighborhood of $x_i$ into the opposite direction than $x_i$ was moved, as shown in FIGS. 11A–11D. These figures show local volume preservation. FIG. 11A is a neighborhood of a vertex in a model before fairing with FIG. 11B showing vertex $x_i$ smoothed. The neighbors vertices $x_j$ of $x_i$ compensate for the change in volume (FIG. 11C) and the final model after fairing and volume preservation is shown in FIG. 11D.

Vertices in the one-neighborhood of $x_i$ are not allowed to move in an arbitrary direction to preserve the volume of the model. Instead one vector is fixed, along which all the vertices $j \in N_i(i)$ are moved during the fairing of $x_i$. In this embodiment, this vector was chosen to be the Laplacian $\Delta x_i$ of the vertex $x_i$. This choice is motivated by being able to construct a simple formulation of the volume preservation strategy using a linear system of equations. Hence, the change of the volume $\Delta V$ can be formulated as $$\Delta V = \sum_{j \in N_i(i)} \left| \begin{bmatrix} x_i & x_i' & x_j & x_{j+1} \\ 1 & 1 & 1 & 1 \end{bmatrix}^T \right| \quad (19)$$

where the operator $|\cdot|$ represents the determinant of the 4×4 matrices used to evaluate the volume of the associated tetrahedra. With reasonable numerical stability, however, it is possible to use alternative approaches.

Each of the vertices $x_j$ is enforced in the one-neighborhood of $x_i$ to compensate for a part $0 \leq c_j \leq 1$ of $\Delta V$, where $$\sum_{j \in N_i(i)} c_j = 1 \quad (20)$$

Since all the vertices in the one-neighborhood of $x_i$ are moved along the same vector $\Delta x_i$, the following equation must be solved:

$$\sum_{k \in N_i(j)} \left| \begin{bmatrix} x_j & (x_j + t \cdot \Delta x_i) & x_k & x_{k+1} \\ 1 & 1 & 1 & 1 \end{bmatrix}^T \right| = c_j \cdot \Delta V \quad (21)$$

with respect to t. If equation (21) is expanded, a linear equation may be constructed with respect to the unknown t. The solution of this linear equation allows the computation of the new position $x_j'$ of j as $$x_j' = x_j + t \cdot \Delta x \quad (22)$$

Equations (21) and (22) compute a new position of the vertex j correctly, since a volume changed by movement of $x_j$ is independent of a position of the vertices $x_{j-1}$ and $x_{j+1}$.

Figure 12A:
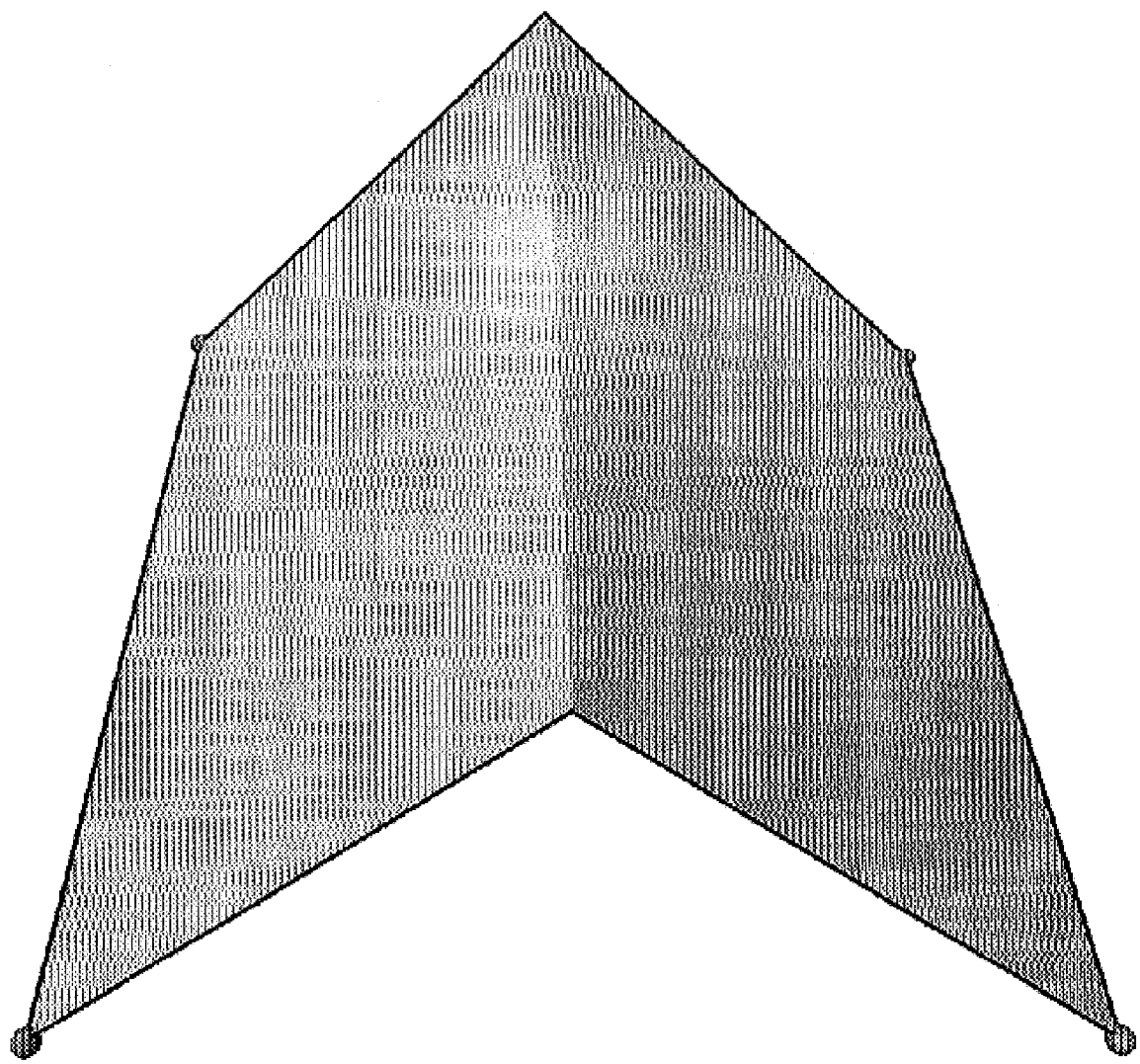
FIG. 12A illustrates a manifold model.
Figure 12B:
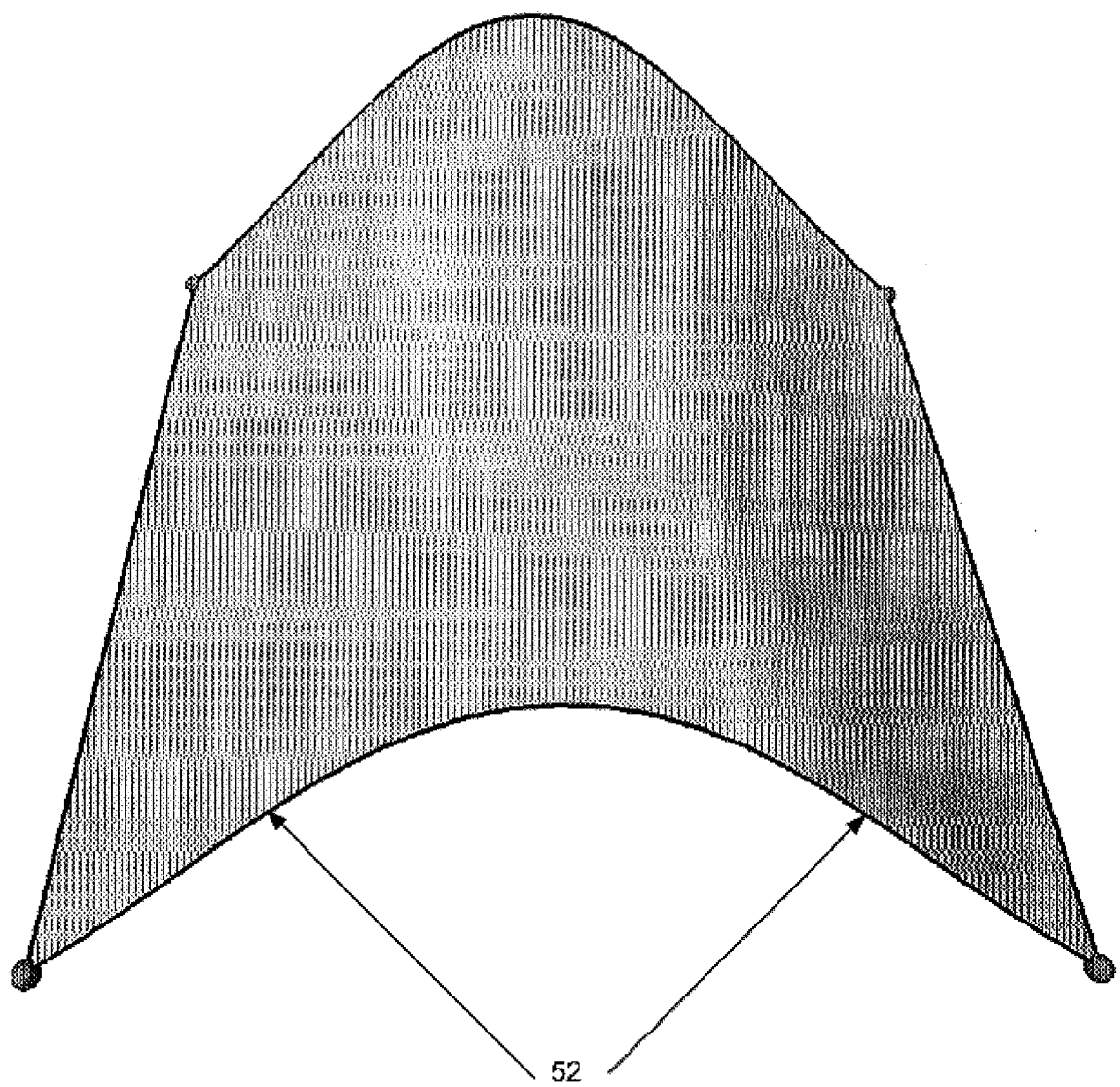
FIG. 12B illustrates a model after fairing using a local volume preservation strategy in accordance with one embodiment of the present invention.

FIGS. 12A and 12B present a result of a volume preserving fairing operation as applied to a simple model. FIG. 12A represents an input model while FIG. 12B show the faired model using the local volume preservation strategy. Almost invisible inflection points (52) on the boundary is a feature of volume preservation. Inflection points (52) are created during the fairing process to allow the model to compensate for the additional volume needed to smooth an initially sharp edge.

Unlike a global volume preservation strategy, the overall shape of the model is not changed in the invention since operations are local. Consider an example where an input model is a V-shaped manifold, a local volume preservation algorithm smooths the model while preserving its volume and its shape, whereas a global volume preservation strategy returns a flat plane in the limit. This example clearly shows the advantages of the local volume preservation over the global volume preservation strategy.

A second extension is point and curve constraints. One of the prominent applications of mesh fairing is removal of noise from meshes that are acquired from real world data, such as meshes constructed from laser-scanners or from seismic data. Noise is usually introduced by imperfect acquisition systems, and it has to be removed in order to reconstruct an original shape.

Conventional fairing operators that have been constructed so far do not distinguish between noise and features. Unexpectedly, during fairing processing special features of meshes might be removed. When constructing a feature-preserving fairing operator, properties of the B-rep data structure are exploited.

This allows the user to preserve two types of features in the non-manifold model (12): sets of zero-features (50) and sets of one-features (20). Zero-vertices can be interpreted as a set of vertices that contains structural information of the non-manifold model (12). To prevent these vertices moving during the fairing process these vertices are set as zero vertices. The use of 1-limits (26) in an interior of a two-feature (22) allows smoothing of curves without requiring cross-curve smoothness.

Figure 13A:
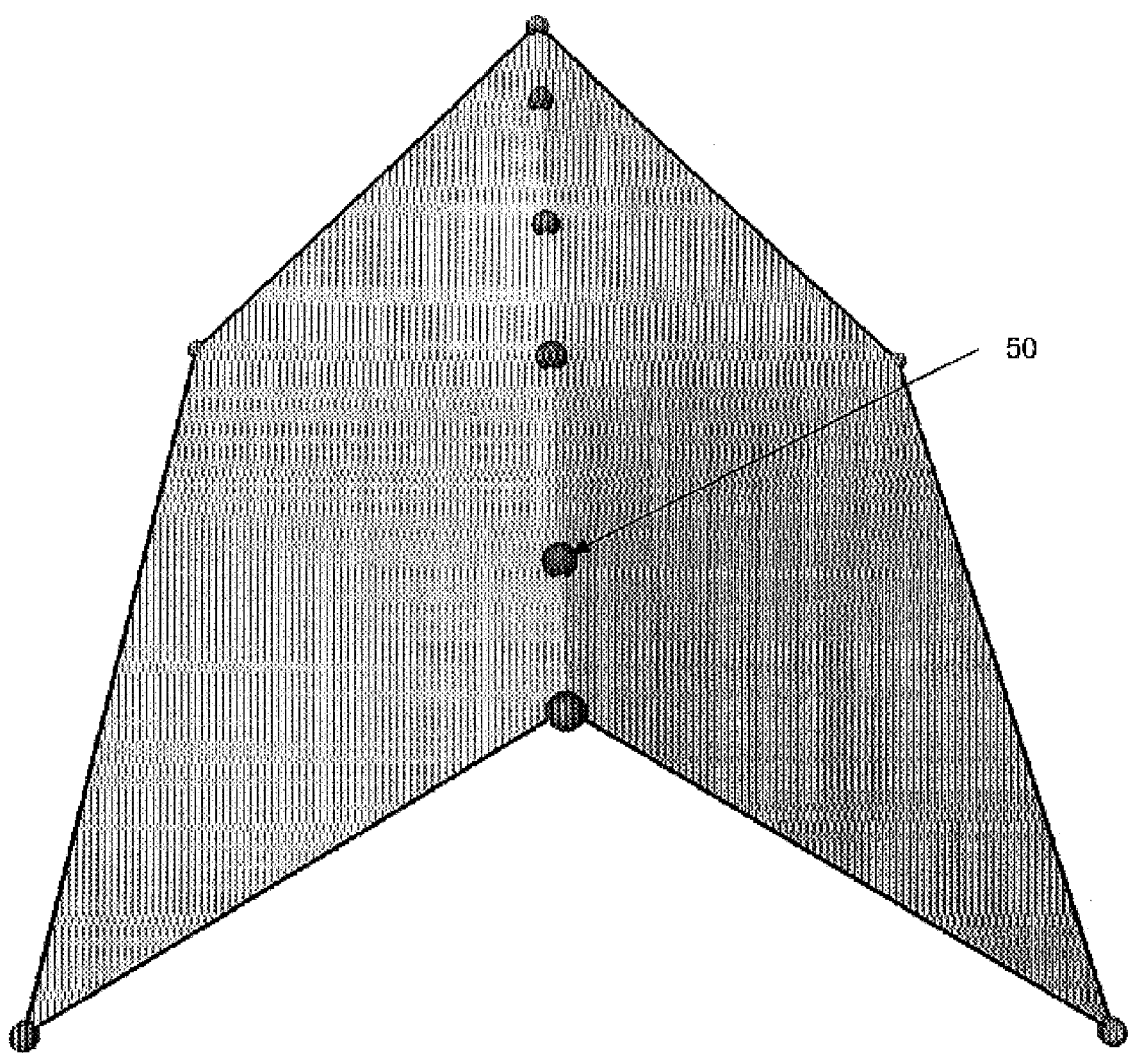
FIG. 13A illustrates a manifold model.
Figure 13B:
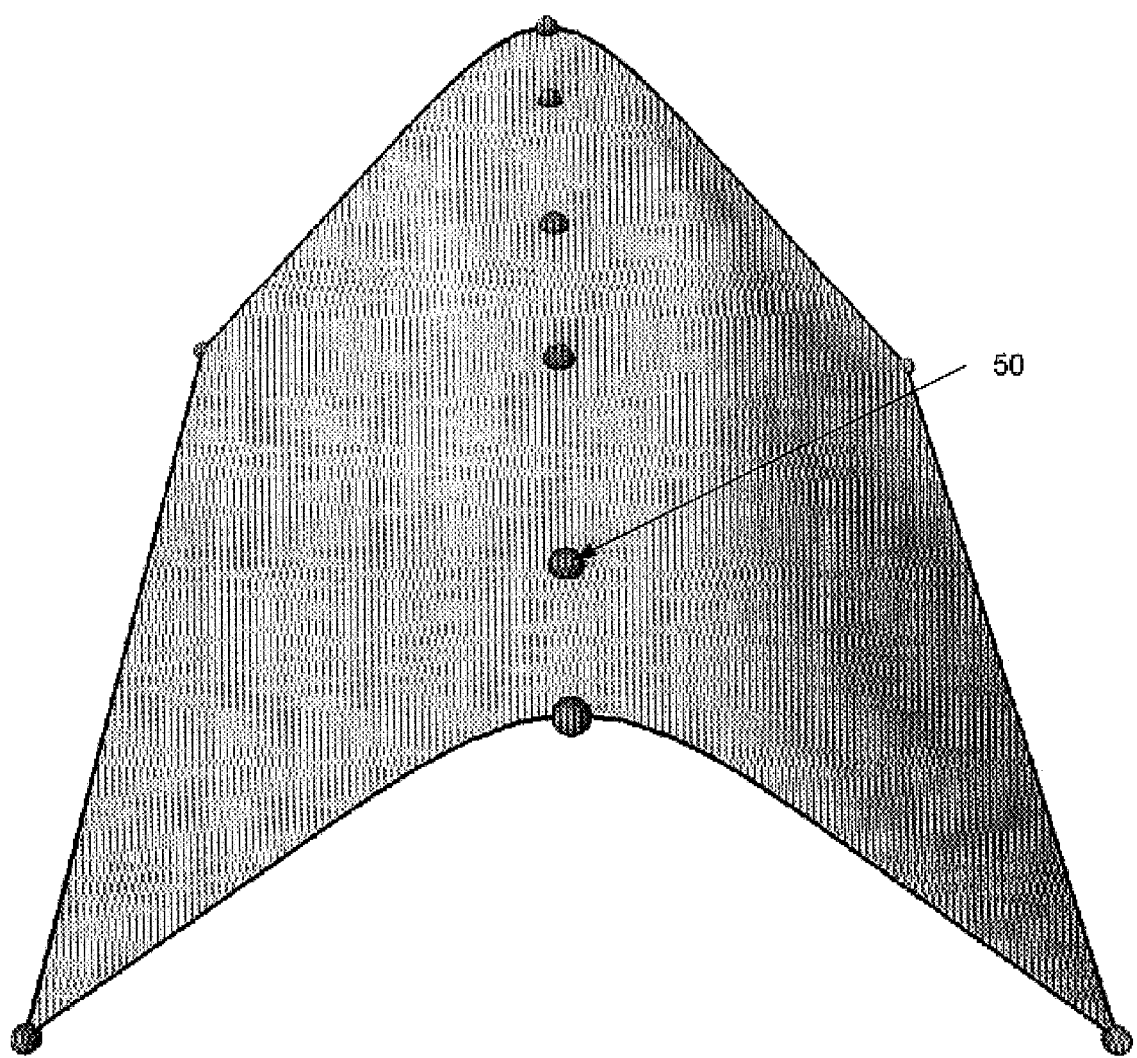
FIG. 13B illustrates a smoothed model that interpolates the zero-vertices in accordance with one embodiment of the present invention.

FIGS. 13A and 13B depict a result of applying this strategy to the manifold model (10) and the non-manifold model (12). FIG. 13A shows an input model (12) with no 1-seams (24) and twelve zero-vertices. FIG. 13B show a smoothed model that interpolates the zero vertices. In this example, six vertices set on top of the V-shaped manifold as zero-features (22). The algorithm smoothed the model while preserving its overall shape and six interpolatory constraints.

Similar approaches to compute a smooth interpolation of vertices exist but the advantage of this approach is that in order to achieve smooth surfaces using interpolatory constraints, it is not first necessary to compute a set of smooth surfaces. It is also not necessary to solve a linear system of equations having the same size as a number of vertices to be smoothly interpolated. Unlike the prior art, in one embodiment of the invention, the B-rep data structure gives feature preservation at no additional cost. In addition, the prior art uses global operators where the invention uses local operators to smooth surfaces.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method of fairing a non-manifold model, comprising:
    determining a plurality of features of the model; and
    smoothing the model by applying a fairing operator to the plurality of features such that noise is removed,
    wherein smoothing comprises:
        determining an approximation of a Laplacian for a first vertex and a second vertex in the non-manifold model, and
        determining a new position for the first vertex using the approximation of the Laplacian for the first vertex and second vertex,
        wherein the second vertex is a one-neighbor of the first vertex.

2. The method of claim 1, further comprising:
    displaying the model on a computer monitor.

3. The method of claim 1, wherein the model is based on a geological model.

4. The method of claim 1, wherein the features comprise at least one feature selected from the group consisting of one-features, two-features and zero-features.

5. The method of claim 1, wherein the model is defined by a plurality of triangle meshes.

6. The method of claim 5, further comprising:
    manipulating the triangle meshes at different levels of resolution.

7. The method of claim 1, wherein the fairing operator is an approximation of a Laplacian operator.

8. The method of claim 1, wherein the fairing operator comprises at least one operator selected from the group consisting of an umbrella operator, an improved umbrella operator, a curvature flow operator and a second order divided differences operator.

9. The method of claim 1, wherein the model has boundaries.

10. The method of claim 1, wherein the model has boundaries with constraints.

11. The method of claim 1, wherein determining the new position comprises:
    determining a distance from the first vertex and the second vertex to a 1-seam or a zero-feature;
    assigning a weight value to the first vertex and the second vertex based upon said distance; and
    choosing the new position of the first vertex using the weight value such that the new position minimizes a property of the model.

12. The method of claim 1, wherein smoothing further comprises:
    preserving a local volume of the non-manifold model, wherein preserving the local volume comprises:
        computing a volume of a tetrahedra defined by a plurality of triangle meshes in a one-neighborhood of the first vector;
        moving the first vertex and the second vertex within at least one of the plurality of triangle meshes along a fixed vector to compensate for a volume change of the tetrahedra caused by smoothing, wherein the fixed vector corresponds to the approximation of the Laplacian of the new position.

13. The method of claim 12, wherein the model is non-manifold.

14. The method of claim 1, wherein determining the approximation of the Laplacian for the first vertex comprises determining a 2-dimensional Laplacian if the first vertex is a non-boundary vertex and determining a 1-dimensional Laplacian if the first vertex is in a one-cell.

15. A system for fairing a non-manifold model, comprising:
    a storage element adapted to store a representation of the model;
    means for determining a plurality of features of the model; and
    means for smoothing the model by applying a fairing operator to the plurality of features such that noise is removed,
    wherein smoothing comprises:
        determining an approximation of a Laplacian for a first vertex and a second vertex in the non-manifold model, and
        determining a new position for the first vertex using the approximation of the Laplacian for the first vertex and second vertex,
        wherein the second vertex is a one-neighbor of the first vertex.

16. The system of claim 15, further comprising:
    a computer monitor adapted to display the model.

17. The method of claim 15, wherein the model is based on a geological model.

18. The system of claim 15, wherein the model is defined by a plurality of triangle meshes.

19. The system of claim 18, further comprising:
    means for manipulating the triangle meshes at different levels of resolution.

20. The system of claim 15, wherein determining the approximation of the Laplacian for the first vertex comprises determining a 2-dimensional Laplacian if the first vertex is a non-boundary vertex and determining a 1-dimensional Laplacian if the vertex is in a one-cell.

21. A method of feature preservation in a model, comprising:
   distinguishing between noise and a plurality of features;
   preserving the plurality of features in the model by setting a plurality of vertices corresponding to the plurality of features to zero-vertices: and
   smoothing the model by applying a fairing operator to the plurality of features such that noise is removed,
   wherein smoothing comprises:
      determining an approximation of a Laplacian for a first vertex and a second vertex in the non-manifold model, and
      determining a new position for the first vertex using the approximation of the Laplacian for the first vertex and second vertex,
      wherein the second vertex is a one-neighbor of the first vertex.

22. The method of claim 21, wherein the plurality of features comprise a plurality of zero-features and a plurality of one features.

23. The method of claim 21, wherein the model is non-manifold.

* * * * *